United States Patent
Koo et al.

(10) Patent No.: US 11,792,430 B2
(45) Date of Patent: *Oct. 17, 2023

(54) METHOD FOR CODING IMAGE ON BASIS OF SECONDARY TRANSFORM AND DEVICE THEREFOR

(71) Applicant: LG Electronics Inc., Seoul (KR)

(72) Inventors: Moonmo Koo, Seoul (KR); Seunghwan Kim, Seoul (KR); Mehdi Salehifar, Seoul (KR); Jaehyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/671,788

(22) Filed: Feb. 15, 2022

(65) Prior Publication Data

US 2022/0174319 A1    Jun. 2, 2022

Related U.S. Application Data

(63) Continuation of application No. 17/327,246, filed on May 21, 2021, now Pat. No. 11,297,347, which is a
(Continued)

(51) Int. Cl.
*H04N 19/60* (2014.01)
*H04N 19/124* (2014.01)
(Continued)

(52) U.S. Cl.
CPC .......... *H04N 19/60* (2014.11); *H04N 19/124* (2014.11); *H04N 19/159* (2014.11);
(Continued)

(58) Field of Classification Search
CPC .... H04N 19/60; H04N 19/124; H04N 19/159; H04N 19/176; H04N 19/18; H04N 19/70; H04N 19/96
See application file for complete search history.

(56) References Cited

U.S. PATENT DOCUMENTS 10,382,759 B2    8/2019   Hsiang et al.
10,708,164 B2 *  7/2020   Seregin ............... H04N 19/132
(Continued)

FOREIGN PATENT DOCUMENTS

KR    20170008288    1/2017
KR    20180121514    11/2018
(Continued)

OTHER PUBLICATIONS

Pierrick Philippe et al., "Improvement of HEVC Inter-Coding Mode Using Multiple Transforms" ISBN 978-0-9928626-7-1 © EURASIP 2017 (Year: 2017).*
(Continued)

*Primary Examiner* — Dramos Kalapodas
(74) *Attorney, Agent, or Firm* — Fish & Richardson P.C.

(57) ABSTRACT

An image decoding method according to the present document comprises a step of deriving modified transform coefficients on the basis of an inverse reduced secondary transform (RST) regarding transform coefficients regarding a target block. The inverse RST is performed on the basis of transform sets determined on the basis of a mapping relation following an intra prediction mode applied to the target block, and a transform kernel matrix selected from two transform kernel matrices included in the transform sets, respectively, and and is performed on the basis of whether or not the inverse RST is applied, and a transform index indicating one of the transform kernel matrices included in the transform sets. A syntax element bin string regarding the transform index is decoded on the basis of a different context set according to the tree type regarding the division structure of the target block.

12 Claims, 13 Drawing Sheets

Related U.S. Application Data continuation of application No. PCT/KR2019/017900, filed on Dec. 17, 2019.

(60) Provisional application No. 62/782,285, filed on Dec. 19, 2018.

(51) Int. Cl.
*H04N 19/159* (2014.01)
*H04N 19/176* (2014.01)
*H04N 19/18* (2014.01)
*H04N 19/70* (2014.01)
*H04N 19/96* (2014.01)

(52) U.S. Cl.
CPC ........... *H04N 19/176* (2014.11); *H04N 19/18* (2014.11); *H04N 19/70* (2014.11); *H04N 19/96* (2014.11)

(56) References Cited

U.S. PATENT DOCUMENTS

| | | | |
|---|---|---|---|
| 2016/0088310 | A1 | 3/2016 | Lin |
| 2017/0094313 | A1* | 3/2017 | Zhao ..................... H04L 43/16 |
| 2017/0094314 | A1* | 3/2017 | Zhao ..................... H04N 19/159 |
| 2017/0324643 | A1* | 11/2017 | Seregin ................. H04N 19/40 |
| 2018/0077417 | A1 | 3/2018 | Huang et al. |
| 2018/0309990 | A1* | 10/2018 | Alshina ................ H04N 19/124 |
| 2019/0052876 | A1 | 2/2019 | Lee et al. |
| 2019/0297325 | A1 | 9/2019 | Lim et al. |
| 2020/0177889 | A1* | 6/2020 | Kim ..................... H04N 19/70 |
| 2020/0221075 | A1 | 7/2020 | Philippe et al. |
| 2020/0288134 | A1 | 9/2020 | Lim et al. |
| 2020/0288139 | A1* | 9/2020 | Lee ..................... H04N 19/117 |
| 2020/0322628 | A1 | 10/2020 | Lee et al. |
| 2020/0366931 | A1 | 11/2020 | Ko et al. |
| 2021/0136395 | A1 | 5/2021 | Jun et al. |
| 2021/0136416 | A1 | 5/2021 | Kim et al. |
| 2021/0218962 | A1 | 7/2021 | Lim et al. |

FOREIGN PATENT DOCUMENTS

| | | | | |
|---|---|---|---|---|
| KR | 20200045366 A | * | 5/2020 | ............. H04N 19/61 |
| WO | WO 2017061671 | | 4/2017 | |
| WO | WO2017192705 | | 11/2017 | |
| WO | WO 2018038554 | | 3/2018 | |
| WO | WO 2018135885 | | 7/2018 | |

OTHER PUBLICATIONS

LG Electronics Inc., "CE 6.2.6: Reduced Secondary Transform (RST)," JVET-K0099, Joint Video Experts Team (JVET) of ITU-T SG 16 WP 3 and ISO/IEC JTC 1/SC 29/WG 11, 11$^{th}$ Meeting, Ljubljana, SI, Jul. 10-18, 2018, 13 pages.

LG Electronics, "Description of SDR video coding technology proposal by LG Electronics," JVET-J0017-v1, Joint Video Experts Team (JVET) of ITU-T SG 16 WP 2 and ISO/IEC JTC 1/SC 29/WG 11, 10$^{th}$ Meeting, San Diego, CA, Apr. 10-20, 2018, 72 pages.

Office Action in Chinese Appln. No. 201980084533.3, dated May 4, 2023, 12 pages (with English translation).

\* cited by examiner

FIG. 6
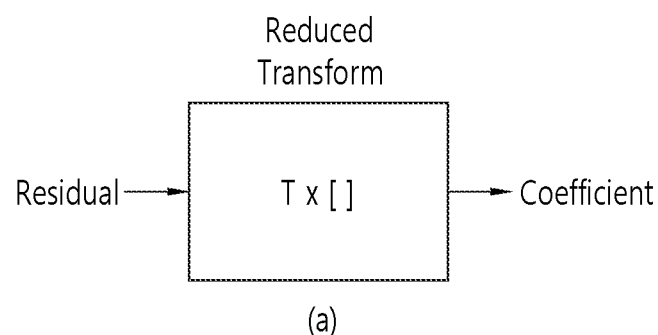
(a)
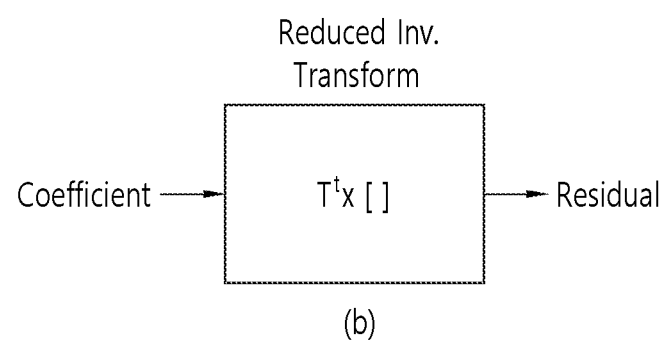
(b)

METHOD FOR CODING IMAGE ON BASIS OF SECONDARY TRANSFORM AND DEVICE THEREFOR

CROSS-REFERENCE TO RELATED APPLICATIONS

This application is a continuation of U.S. application Ser. No. 17/327,246, filed on May 21, 2021, which is a continuation pursuant to 35 U.S.C. § 119(e) of International Application PCT/KR2019/017900, with an international filing date of Dec. 17, 2019, which claims the benefit of U.S. Provisional Patent Application No. 62/782,285, filed on Dec. 19, 2018, the contents of which are hereby incorporated by reference herein in their entirety.

TECHNICAL FIELD

The present disclosure relates generally to an image coding technology and, more particularly, to an image coding method based on a transform in an image coding system and an apparatus therefor.

BACKGROUND

Nowadays, the demand for high-resolution and high-quality images/videos such as 4K, 8K or more ultra high definition (UHD) images/videos has been increasing in various fields. As the image/video data becomes higher resolution and higher quality, the transmitted information amount or bit amount increases as compared to the conventional image data. Therefore, when image data is transmitted using a medium such as a conventional wired/wireless broadband line or image/video data is stored using an existing storage medium, the transmission cost and the storage cost thereof are increased.

Further, nowadays, the interest and demand for immersive media such as virtual reality (VR), artificial reality (AR) content or hologram, or the like is increasing, and broadcasting for images/videos having image features different from those of real images, such as a game image is increasing.

Accordingly, there is a need for a highly efficient image/video compression technique for effectively compressing and transmitting or storing, and reproducing information of high resolution and high quality images/videos having various features as described above.

SUMMARY

A technical aspect of the present disclosure is to provide a method and an apparatus for increasing image coding efficiency.

Another aspect of the present disclosure is to provide a method and an apparatus for increasing transform efficiency.

Still another technical aspect of the present disclosure is to provide a method and an apparatus for increasing the efficiency of a secondary transform through coding of a transform index.

Yet another technical aspect of the present disclosure is to provide an image coding method and an image coding apparatus which are based on reduced secondary transform (RST).

Still another technical aspect of the present disclosure is to provide an image coding method and an image coding apparatus which are based on a transform set and capable of increasing coding efficiency.

According to an embodiment of the present disclosure, there is provided an image decoding method performed by a decoding apparatus. The method may include: deriving quantized transform coefficients for a target block from a bitstream; deriving transform coefficients through dequantization based on the quantized transform coefficients for the target block; deriving modified transform coefficients based on an inverse reduced secondary transform (RST) for the transform coefficients; deriving residual samples for the target block based on an inverse primary transform for the modified transform coefficients; and generating a reconstructed picture based on the residual samples for the target block, wherein the inverse RST may be performed based on a transform set determined based on a mapping relationship according to an intra prediction mode applied to the target block and a transform kernel matrix selected from among two transform kernel matrices included in each of the transform set, and may be performed based on a transform index related to whether the inverse RST is applied and one of the transform kernel matrices included in the transform set, and wherein a syntax element bin string for the transform index is decoded based on a different context set according to a tree type for a partitioning structure of the target block.

According to another embodiment of the present disclosure, there is provided a decoding apparatus for performing image decoding. The decoding apparatus may include: an entropy decoder to derive information on prediction and quantized transform coefficients for a target block from a bitstream; a predictor to generate a prediction sample for the target block based on the information on prediction; a dequantizer to derive transform coefficients through dequantization based on the quantized transform coefficients for the target block; an inverse transformer to include an inverse reduced secondary transformer (RST) that derives modified transform coefficients based on inverse RST of the transform coefficients and an inverse primary transformer that derives residual samples for the target block based on first inverse transform of the modified transform coefficients; and an adder to generate reconstructed samples based on the residual samples and the prediction samples, wherein the inverse RST may be performed based on a transform set determined based on a mapping relationship according to an intra prediction mode applied to the target block and a transform kernel matrix selected from among two transform kernel matrices included in each of the transform set, and may be performed based on a transform index indicating whether the inverse RST is applied and one of the transform kernel matrices included in the transform set, and wherein a syntax element bin string for the transform index is decoded based on a different context set according to a tree type for a partitioning structure of the target block.

According to still another embodiment of the present disclosure, there is provided an image encoding method performed by an encoding apparatus. The method may include: deriving prediction samples based on an intra prediction mode applied to a target block; deriving residual samples for the target block based on the prediction sample; deriving transform coefficients for the target block based on a primary transform for the residual samples; deriving modified transform coefficients based on a reduced secondary transform (RST) of the transform coefficients, the inverse RST being performed based on a transform set determined based on a mapping relationship according to the intra prediction mode applied to the target block and a transform kernel matrix selected from among two transform kernel matrices included in each of the transform set;

deriving quantized transform coefficients by performing quantization based on the modified transform coefficients; and generating a transform index indicating whether the inverse RST is applied and one of the transform kernel matrices included in the transform set and wherein a syntax element bin string for the transform index is decoded based on a different context set according to a tree type for a partitioning structure of the target block.

According to yet another embodiment of the present disclosure, there may be provided a digital storage medium that stores image data including encoded image information generated according to an image encoding method performed by an encoding apparatus.

According to still another embodiment of the present disclosure, there may be provided a digital storage medium that stores image data including encoded image information or a bitstream to cause a decoding apparatus to perform the image decoding method.

According to the present disclosure, it is possible to increase overall image/video compression efficiency.

According to the present disclosure, it is possible to increase the efficiency of a secondary transform through coding of a transform index.

According to the present disclosure, it is possible to increase image coding efficiency by performing image coding based on a transform set.

BRIEF DESCRIPTION OF THE DRAWINGS

FIG. 6 is a diagram illustrating an RST according to an embodiment of the present disclosure.

DESCRIPTION OF EXEMPLARY EMBODIMENTS

Figure 1:
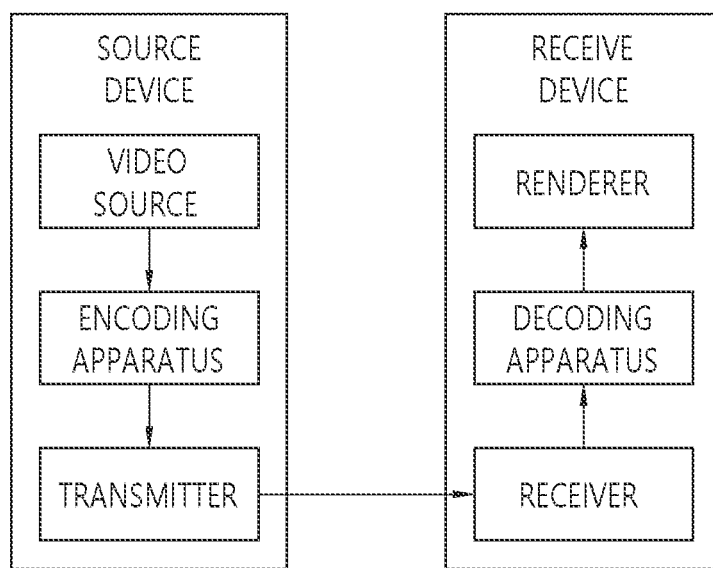
FIG. 1 schematically illustrates an example of a video/image coding system to which the present disclosure is applicable.

While the present disclosure may be susceptible to various modifications and include various embodiments, specific embodiments thereof have been shown in the drawings by way of example and will now be described in detail. However, this is not intended to limit the present disclosure to the specific embodiments disclosed herein. The terminology used herein is for the purpose of describing specific embodiments only, and is not intended to limit technical idea of the present disclosure. The singular forms may include the plural forms unless the context clearly indicates otherwise. The terms such as "include" and "have" are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present disclosure as long as they do not depart from the essence of the present disclosure.

Hereinafter, preferred embodiments of the present disclosure will be explained in more detail while referring to the attached drawings. In addition, the same reference signs are used for the same components on the drawings, and repeated descriptions for the same components will be omitted.

This document relates to video/image coding. For example, the method/example disclosed in this document may relate to a VVC (Versatile Video Coding) standard (ITU-T Rec. H.266), a next-generation video/image coding standard after VVC, or other video coding related standards (e.g., HEVC (High Efficiency Video Coding) standard (ITU-T Rec. H.265), EVC (essential video coding) standard, AVS2 standard, etc.).

In this document, a variety of embodiments relating to video/image coding may be provided, and, unless specified to the contrary, the embodiments may be combined to each other and be performed.

In this document, a video may mean a set of a series of images over time. Generally a picture means a unit representing an image at a specific time zone, and a slice/tile is a unit constituting a part of the picture. The slice/tile may include one or more coding tree units (CTUs). One picture may be constituted by one or more slices/tiles. One picture may be constituted by one or more tile groups. One tile group may include one or more tiles.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, the sample may refer to a pixel value in the spatial domain, or when this pixel value is converted to the frequency domain, it may refer to a transform coefficient in the frequency domain.

A unit may represent the basic unit of image processing. The unit may include at least one of a specific region and information related to the region. One unit may include one luma block and two chroma (e.g., cb, cr) blocks. The unit and a term such as a block, an area, or the like may be used in place of each other according to circumstances. In a general case, an M×N block may include a set (or an array) of samples (or sample arrays) or transform coefficients consisting of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may include 1) only A, 2) only B, and/or 3) both A and B. In other words, the term "or" in this document should be interpreted to indicate "additionally or alternatively."

FIG. 1 schematically illustrates an example of a video/image coding system to which the present disclosure is applicable.

Referring to FIG. 1, the video/image coding system may include a first device (source device) and a second device (receive device). The source device may deliver encoded video/image information or data in the form of a file or streaming to the receive device via a digital storage medium or network.

The source device may include a video source, an encoding apparatus, and a transmitter. The receive device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain a video/image through a process of capturing, synthesizing, or generating a video/image. The video source may include a video/image capture device and/or a video/image generating device. The video/image capture device may include, for example, one or more cameras, video/image archives including previously captured video/images, or the like. The video/image generating device may include, for example, a computer, a tablet and a smartphone, and may (electronically) generate a video/image. For example, a virtual video/image may be generated through a computer or the like. In this case, the video/image capturing process may be replaced by a process of generating related data.

The encoding apparatus may encode an input video/image. The encoding apparatus may perform a series of procedures such as prediction, transform, and quantization for compression and coding efficiency. The encoded data (encoded video/image information) may be output in the form of a bitstream.

The transmitter may transmit the encoded video/image information or data output in the form of a bitstream to the receiver of the receive device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format, and may include an element for transmission through a broadcast/communication network. The receiver may receive/extract the bitstream and transmit the received/extracted bitstream to the decoding apparatus.

The decoding apparatus may decode a video/image by performing a series of procedures such as dequantization, inverse transform, prediction, and the like corresponding to the operation of the encoding apparatus.

The renderer may render the decoded video/image. The rendered video/image may be displayed through the display.

Figure 2:
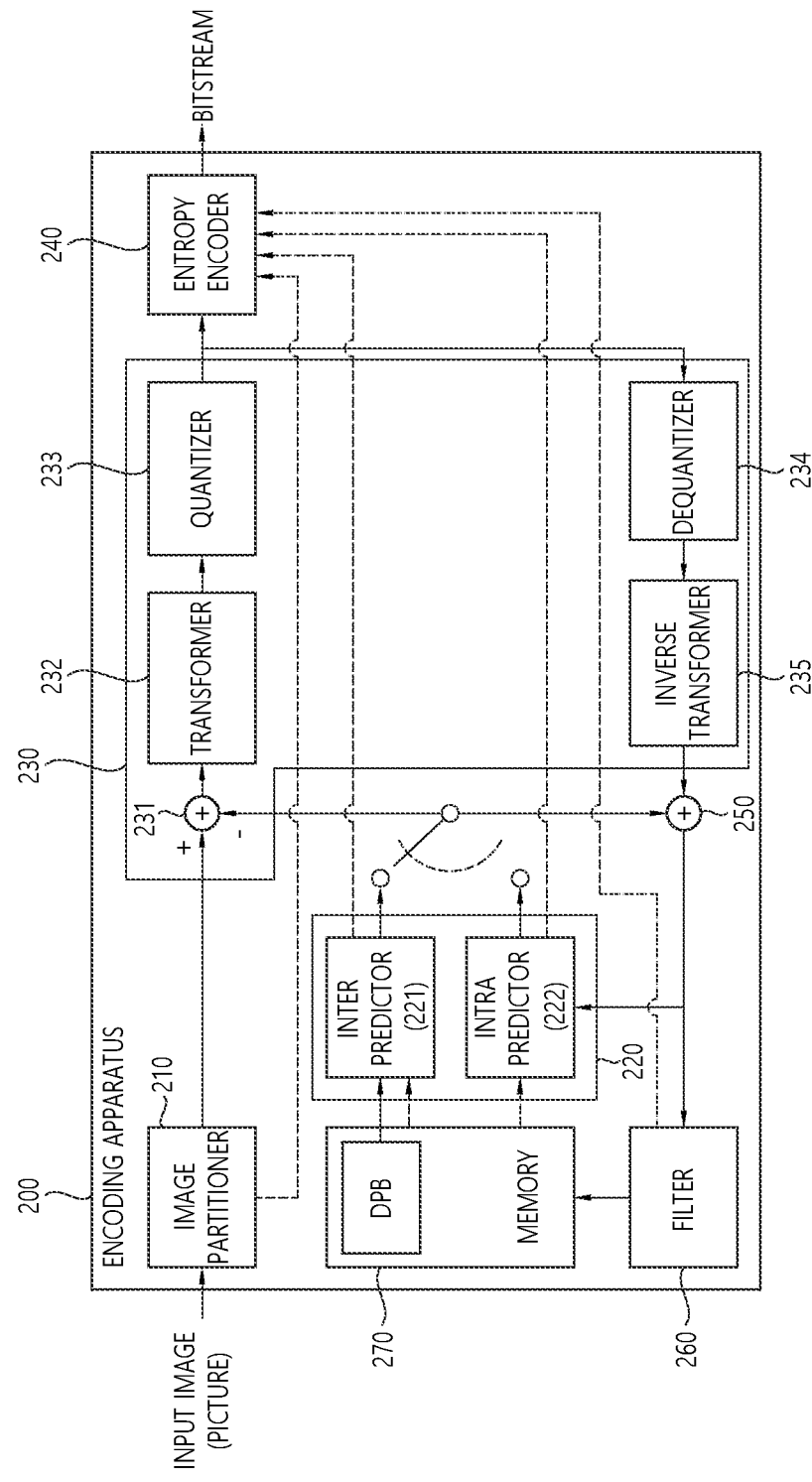
FIG. 2 is a diagram schematically illustrating a configuration of a video/image encoding apparatus to which the present disclosure is applicable.

FIG. 2 is a diagram schematically illustrating a configuration of a video/image encoding apparatus to which the present disclosure is applicable. Hereinafter, what is referred to as the video encoding apparatus may include an image encoding apparatus.

Referring to FIG. 2, the encoding apparatus 200 may include an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be constituted by one or more hardware components (e.g., encoder chipsets or processors) according to an embodiment. Further, the memory 270 may include a decoded picture buffer (DPB), and may be constituted by a digital storage medium. The hardware component may further include the memory 270 as an internal/external component.

The image partitioner 210 may partition an input image (or a picture or a frame) input to the encoding apparatus 200 into one or more processing units. As one example, the processing unit may be called a coding unit (CU). In this case, starting with a coding tree unit (CTU) or the largest coding unit (LCU), the coding unit may be recursively partitioned according to the Quad-tree binary-tree ternary-tree (QTBTTT) structure. For example, one coding unit may be divided into a plurality of coding units of a deeper depth based on the quad-tree structure, the binary-tree structure, and/or the ternary structure. In this case, for example, the quad-tree structure may be applied first and the binary-tree structure and/or the ternary structure may be applied later. Alternatively, the binary-tree structure may be applied first. The coding procedure according to the present disclosure may be performed based on the final coding unit which is not further partitioned. In this case, the maximum coding unit may be used directly as a final coding unit based on coding efficiency according to the image characteristic. Alternatively, the coding unit may be recursively partitioned into coding units of a further deeper depth as needed, so that the coding unit of an optimal size may be used as a final coding unit. Here, the coding procedure may include procedures such as prediction, transform, and reconstruction, which will be described later. As another example, the processing unit may further include a prediction unit (PU) or a transform unit (TU). In this case, the prediction unit and the transform unit may be split or partitioned from the above-described final coding unit. The prediction unit may be a unit of sample prediction, and the transform unit may be a unit for deriving a transform coefficient and/or a unit for deriving a residual signal from a transform coefficient.

The unit and a term such as a block, an area, or the like may be used in place of each other according to circumstances. In a general case, an M×N block may represent a set of samples or transform coefficients consisting of M columns and N rows. The sample may generally represent a pixel or a value of a pixel, and may represent only a pixel/pixel value of a luma component, or only a pixel/pixel value of a chroma component. The sample may be used as a term corresponding to a pixel or a pel of one picture (or image).

The subtractor 231 subtractes a prediction signal (predicted block, prediction sample array) output from the inter predictor 221 or the intra predictor 222 from an input image signal (original block, original sample array) to generate a residual signal (residual block, residual sample array), and the generated residual signal is transmitted to the transformer 232. In this case, as shown, a unit which subtracts the prediction signal (predicted block, prediction sample array) from the input image signal (original block, original sample array) in the encoder 200 may be called the subtractor 231. The predictor may perform prediction on a processing target block (hereinafter, referred to as 'current block'), and may generate a predicted block including prediction samples for the current block. The predictor may determine whether intra prediction or inter prediction is applied on a current block or CU basis. As discussed later in the description of each prediction mode, the predictor may generate various information relating to prediction, such as prediction mode information, and transmit the generated information to the entropy encoder 240. The information on the prediction may be encoded in the entropy encoder 240 and output in the form of a bitstream.

The intra predictor 222 may predict the current block by referring to samples in the current picture. The referred samples may be located in the neighbor of or apart from the current block according to the prediction mode. In the intra prediction, prediction modes may include a plurality of non-directional modes and a plurality of directional modes. The non-directional modes may include, for example, a DC mode and a planar mode. The directional mode may include, for example, 33 directional prediction modes or 65 directional prediction modes according to the degree of detail of the prediction direction. However, this is merely an example, and more or less directional prediction modes may be used depending on a setting. The intra predictor 222 may determine the prediction mode applied to the current block by using the prediction mode applied to the neighboring block.

The inter predictor 221 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. The reference picture including the reference block and the reference picture including the temporal neighboring block may be same to each other or different from each other. The temporal neighboring block may be called a collocated reference block, a collocated CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion information prediction (motion vector prediction, MVP) mode, the motion vector of the neighboring block may be used as a motion vector predictor and the motion vector of the current block may be indicated by signaling a motion vector difference.

The predictor 220 may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The prediction signal generated through the inter predictor 221 and/or the intra predictor 222 may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than the square one.

The quantizer 233 may quantize the transform coefficients and transmit them to the entropy encoder 240, and the entropy encoder 240 may encode the quantized signal (information on the quantized transform coefficients) and output the encoded signal in a bitstream. The information on the quantized transform coefficients may be referred to as residual information. The quantizer 233 may rearrange block type quantized transform coefficients into a one-dimensional vector form based on a coefficient scan order, and generate information on the quantized transform coefficients based on the quantized transform coefficients of the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g. values of syntax elements, etc.) together or separately. Encoded information (e.g., encoded video/image information) may be transmitted or stored on a unit basis of a network abstraction layer (NAL) in the form of a bitstream. The video/image information may further include information on various parameter sets such as an adaptation parameter set (APS), a picture parameter set (PPS), a sequence parameter set (SPS), a video parameter set (VPS) or the like. Further, the video/image information may further include general constraint information. In the present disclosure, information and/or syntax elements which are transmitted/signaled to the decoding apparatus from the encoding apparatus may be included in video/image information. The video/image information may be encoded through the above-described encoding procedure and included in the bitstream. The bitstream may be transmitted through a network, or stored in a digital storage medium. Here, the network may include a broadcast network, a communication network and/or the like, and the digital storage medium may include various storage media such as USB, SD, CD, DVD, Blu-ray, HDD, SSD, and the like. A transmitter (not shown) which transmits a signal output from the entropy encoder 240 and/or a storage (not shown) which stores it may be configured as an internal/external element of the encoding apparatus 200, or the transmitter may be included in the entropy encoder 240.

Quantized transform coefficients output from the quantizer 233 may be used to generate a prediction signal. For example, by applying dequantization and inverse transform to quantized transform coefficients through the dequantizer 234 and the inverse transformer 235, the residual signal (residual block or residual samples) may be reconstructed. The adder 155 adds the reconstructed residual signal to a prediction signal output from the inter predictor 221 or the intra predictor 222, so that a reconstructed signal (reconstructed picture, reconstructed block, reconstructed sample array) may be generated. When there is no residual for a processing target block as in a case where the skip mode is applied, the predicted block may be used as a reconstructed block. The adder 250 may be called a reconstructor or a reconstructed block generator. The generated reconstructed signal may be used for intra prediction of a next processing target block in the current block, and as described later, may be used for inter prediction of a next picture through filtering.

Meanwhile, in the picture encoding and/or reconstructing process, luma mapping with chroma scaling (LMCS) may be applied.

The filter 260 may improve subjective/objective video quality by applying the filtering to the reconstructed signal. For example, the filter 260 may generate a modified reconstructed picture by applying various filtering methods to the reconstructed picture, and may store the modified reconstructed picture in the memory 270, specifically in the DPB of the memory 270. The various filtering methods may include, for example, deblocking filtering, sample adaptive offset, an adaptive loop filter, a bilateral filter or the like. As discussed later in the description of each filtering method, the filter 260 may generate various information relating to filtering, and transmit the generated information to the entropy encoder 240. The information on the filtering may be encoded in the entropy encoder 240 and output in the form of a bitstream.

The modified reconstructed picture which has been transmitted to the memory 270 may be used as a reference picture in the inter predictor 221. Through this, the encoding apparatus can avoid prediction mismatch in the encoding apparatus 100 and a decoding apparatus when the inter prediction is applied, and can also improve coding efficiency.

The memory 270 DPB may store the modified reconstructed picture in order to use it as a reference picture in the inter predictor 221. The memory 270 may store motion information of a block in the current picture, from which motion information has been derived (or encoded) and/or motion information of blocks in an already reconstructed picture. The stored motion information may be transmitted to the inter predictor 221 to be utilized as motion information of a neighboring block or motion information of a temporal neighboring block. The memory 270 may store reconstructed samples of reconstructed blocks in the current picture, and transmit them to the intra predictor 222.

Figure 3:
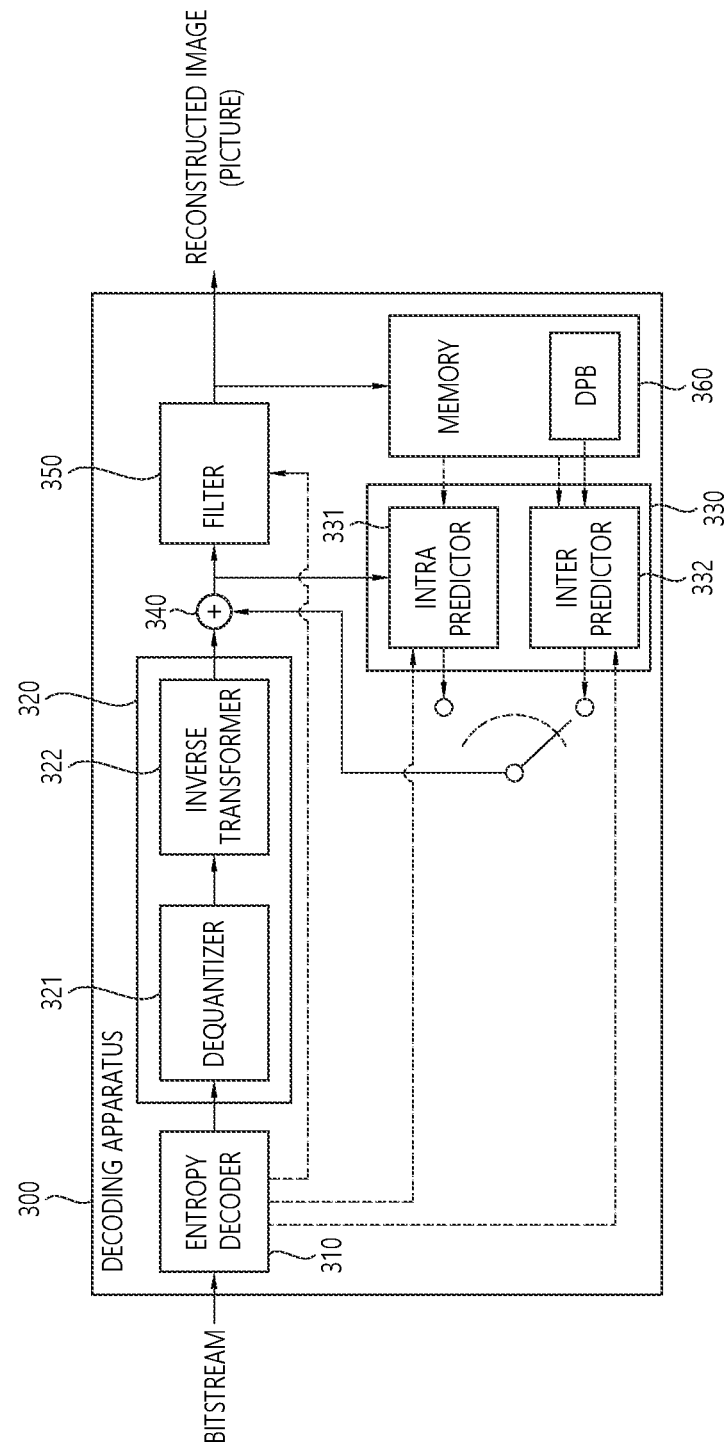
FIG. 3 is a diagram schematically illustrating a configuration of a video/image decoding apparatus to which the present disclosure is applicable.

FIG. 3 is a diagram schematically illustrating a configuration of a video/image decoding apparatus to which the present disclosure is applicable.

Referring to FIG. 3, the video decoding apparatus 300 may include an entropy decoder 310, a residual processor 320, a predictor 330, an adder 340, a filter 350 and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350, which have been described above, may be constituted by one or more hardware components (e.g., decoder chipsets or processors) according to an embodiment. Further, the memory 360 may include a decoded picture buffer (DPB), and may be constituted by a digital storage medium. The hardware component may further include the memory 360 as an internal/external component.

When a bitstream including video/image information is input, the decoding apparatus 300 may reconstruct an image correspondingly to a process by which video/image information has been processed in the encoding apparatus of FIG. 2. For example, the decoding apparatus 300 may derive units/blocks based on information relating to block partition obtained from the bitstream. The decoding apparatus 300 may perform decoding by using a processing unit applied in the encoding apparatus. Therefore, the processing unit of decoding may be, for example, a coding unit, which may be partitioned along the quad-tree structure, the binary-tree structure, and/or the ternary-tree structure from a coding tree unit or a largest coding unit. One or more transform units may be derived from the coding unit. And, the reconstructed image signal decoded and output through the decoding apparatus 300 may be reproduced through a reproducer.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) required for image reconstruction (or picture reconstruction). The video/image information may further include information on various parameter sets such as an adaptation parameter set (APS), a picture parameter set (PPS), a sequence parameter set (SPS), a video parameter set (VPS) or the like. Further, the video/image information may further include general constraint information. The decoding apparatus may decode a picture further based on information on the parameter set and/or the general constraint information. In the present disclosure, signaled/received information and/or syntax elements, which will be described later, may be decoded through the decoding procedure and be obtained from the bitstream. For example, the entropy decoder 310 may decode information in the bitstream based on a coding method such as exponential Golomb encoding, CAVLC, CABAC, or the like, and may output a value of a syntax element necessary for image reconstruction and quantized values of a transform coefficient regarding a residual. More specifically, a CABAC entropy decoding method may receive a bin corresponding to each syntax element in a bitstream, determine a context model using decoding target syntax element information and decoding information of neighboring and decoding target blocks, or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model. Information on prediction among information decoded in the entropy decoder 310 may be provided to the predictor (inter predictor 332 and intra predictor 331), and residual values, that is, quantized transform coefficients, on which entropy decoding has been performed in the entropy decoder 310, and associated parameter information may be input to the residual processor 320. The residual processor 320 may derive a residual signal (residual block, residual samples, residual sample array). Further, information on filtering among information decoded in the entropy decoder 310 may be provided to the filter 350. Meanwhile, a receiver (not shown) which receives a signal output from the encoding apparatus may further constitute the decoding apparatus 300 as an internal/external element, and the receiver may be a component of the entropy decoder 310. Meanwhile, the decoding apparatus according to the present disclosure may be called a video/image/picture coding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may output transform coefficients by dequantizing the quantized transform coefficients. The dequantizer 321 may rearrange the quantized transform coefficients in the form of a two-dimensional block. In this case, the rearrangement may perform rearrangement based on an order of coefficient scanning which has been performed in the encoding apparatus. The dequantizer 321 may perform dequantization on the quantized transform coefficients using quantization parameter (e.g., quantization step size information), and obtain transform coefficients.

The deqauntizer 322 obtains a residual signal (residual block, residual sample array) by inverse transforming transform coefficients.

The predictor may perform prediction on the current block, and generate a predicted block including prediction samples for the current block. The predictor may determine whether intra prediction or inter prediction is applied to the current block based on the information on prediction output from the entropy decoder 310, and specifically may determine an intra/inter prediction mode.

The predictor may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). In addition, the predictor may perform intra block copy (IBC) for prediction on a block. The intra block copy may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The intra predictor 331 may predict the current block by referring to the samples in the current picture. The referred samples may be located in the neighbor of or apart from the current block according to the prediction mode. In the intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. For example, the inter predictor 332 may configure a motion information candidate list based on neighboring blocks, and derive a motion vector and/or a reference picture index of the current block based on received candidate selection information. Inter prediction may be performed based on various prediction modes, and the information on prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor 330. When there is no residual for a processing target block as in a case where the skip mode is applied, the predicted block may be used as a reconstructed block.

The adder 340 may be called a reconstructor or a reconstructed block generator. The generated reconstructed signal may be used for intra prediction of a next processing target block in the current block, and as described later, may be output through filtering or be used for inter prediction of a next picture.

Meanwhile, in the picture decoding process, luma mapping with chroma scaling (LMCS) may be applied.

The filter 350 may improve subjective/objective video quality by applying the filtering to the reconstructed signal. For example, the filter 350 may generate a modified reconstructed picture by applying various filtering methods to the reconstructed picture, and may transmit the modified reconstructed picture in the memory 360, specifically in the DPB of the memory 360. The various filtering methods may include, for example, deblocking filtering, sample adaptive offset, an adaptive loop filter, a bilateral filter or the like.

The (modified) reconstructed picture which has been stored in the DPB of the memory 360 may be used as a reference picture in the inter predictor 332. The memory 360 may store motion information of a block in the current picture, from which motion information has been derived (or decoded) and/or motion information of blocks in an already reconstructed picture. The stored motion information may be transmitted to the inter predictor 260 to be utilized as motion information of a neighboring block or motion information of a temporal neighboring block. The memory 360 may store reconstructed samples of reconstructed blocks in the current picture, and transmit them to the intra predictor 331.

In this specification, the examples described in the predictor 330, the dequantizer 321, the inverse transformer 322, and the filter 350 of the decoding apparatus 300 may be similarly or correspondingly applied to the predictor 220, the dequantizer 234, the inverse transformer 235, and the filter 260 of the encoding apparatus 200, respectively.

As described above, prediction is performed in order to increase compression efficiency in performing video coding. Through this, a predicted block including prediction samples for a current block, which is a coding target block, may be generated. Here, the predicted block includes prediction samples in a space domain (or pixel domain). The predicted block may be indentically derived in the encoding apparatus and the decoding apparatus, and the encoding apparatus may increase image coding efficiency by signaling to the decoding apparatus not original sample value of an original block itself but information on residual (residual information) between the original block and the predicted block. The decoding apparatus may derive a residual block including residual samples based on the residual information, generate a reconstructed block including reconstructed samples by adding the residual block to the predicted block, and generate a reconstructed picture including reconstructed blocks.

The residual information may be generated through transform and quantization procedures. For example, the encoding apparatus may derive a residual block between the original block and the predicted block, derive transform coefficients by performing a transform procedure on residual samples (residual sample array) included in the residual block, and derive quantized transform coefficients by performing a quantization procedure on the transform coefficients, so that it may signal associated residual information to the decoding apparatus (through a bitstream). Here, the residual information may include value information, position information, a transform technique, transform kernel, a quantization parameter or the like of the quantized transform coefficients. The decoding apparatus may perform a quantization/dequantization procedure and derive the residual samples (or residual sample block), based on residual information. The decoding apparatus may generate a reconstructed block based on a predicted block and the residual block. The encoding apparatus may derive a residual block by dequantizing/inverse transforming quantized transform coefficients for reference for inter prediction of a next picture, and may generate a reconstructed picture based on this.

Figure 4:
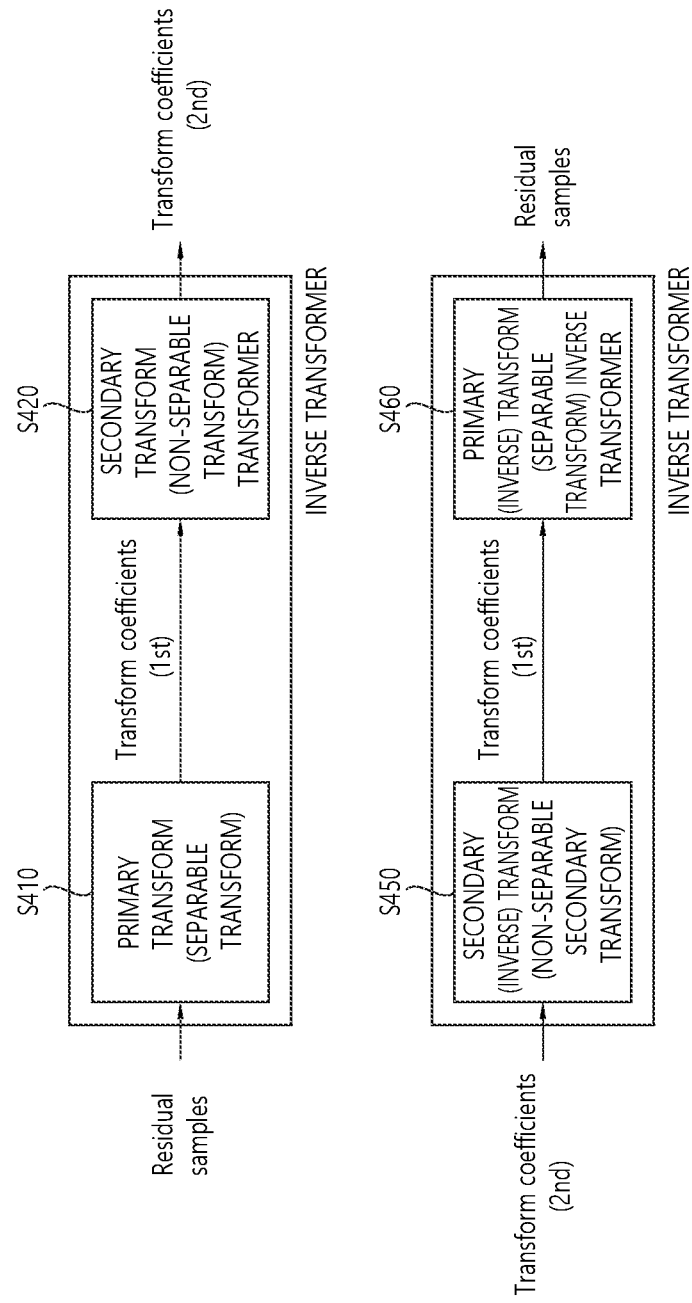
FIG. 4 schematically illustrates a multiple transform technique according to an embodiment of the present disclosure.

FIG. 4 schematically illustrates a multiple transform technique according to an embodiment of the present disclosure.

Referring to FIG. 4, a transformer may correspond to the transformer in the encoding apparatus of foregoing FIG. 2, and an inverse transformer may correspond to the inverse transformer in the encoding apparatus of foregoing FIG. 2, or to the inverse transformer in the decoding apparatus of FIG. 3.

The transformer may derive (primary) transform coefficients by performing a primary transform based on residual samples (residual sample array) in a residual block (S410). This primary transform may be referred to as a core transform. Herein, the primary transform may be based on multiple transform selection (MTS), and when a multiple transform is applied as the primary transform, it may be referred to as a multiple core transform.

The multiple core transform may represent a method of transforming additionally using discrete cosine transform (DCT) type 2 and discrete sine transform (DST) type 7, DCT type 8, and/or DST type 1. That is, the multiple core transform may represent a transform method of transforming a residual signal (or residual block) of a space domain into transform coefficients (or primary transform coefficients) of a frequency domain based on a plurality of transform kernels selected from among the DCT type 2, the DST type 7, the DCT type 8 and the DST type 1. Herein, the primary transform coefficients may be called temporary transform coefficients from the viewpoint of the transformer.

In other words, when the conventional transform method is applied, transform coefficients might be generated by applying transform from a space domain to a frequency domain for a residual signal (or residual block) based on the DCT type 2. Unlike to this, when the multiple core transform is applied, transform coefficients (or primary transform coefficients) may be generated by applying transform from a space domain to a frequency domain for a residual signal (or residual block) based on the DCT type 2, the DST type 7, the DCT type 8, and/or DST type 1. Herein, the DCT type 2, the DST type 7, the DCT type 8, and the DST type 1 may be called a transform type, transform kernel or transform core.

For reference, the DCT/DST transform types may be defined based on basis functions, and the basis functions may be represented as in the following table.

TABLE 1

| Transform Type | Basis function $T_i(j)$, i, j = 0, 1, ..., N − 1 |
| --- | --- |
| DCT-II | $T_i(j) = \omega_0 \cdot \sqrt{\frac{2}{N}} \cdot \cos\left(\frac{\pi \cdot i \cdot (2j+1)}{2N}\right)$ where $\omega_0 = \begin{cases} \sqrt{\frac{2}{N}} & i = 0 \\ 1 & i \neq 0 \end{cases}$ |
| DCT-V | $T_i(j) = \omega_0 \cdot \omega_1 \cdot \sqrt{\frac{2}{2N-1}} \cdot \cos\left(\frac{2\pi \cdot i \cdot j}{2N-1}\right)$, where $\omega_0 = \begin{cases} \sqrt{\frac{2}{N}} & i = 0 \\ 1 & i \neq 0 \end{cases}$, $\omega_1 = \begin{cases} \sqrt{\frac{2}{N}} & j = 0 \\ 1 & j \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-I | $T_i(j) = \sqrt{\frac{2}{N+1}} \cdot \sin\left(\frac{\pi \cdot (i+1) \cdot (j+1)}{N+1}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

If the multiple core transform is performed, then a vertical transform kernel and a horizontal transform kernel for a target block may be selected from among the transform kernels, a vertical transform for the target block may be performed based on the vertical transform kernel, and a horizontal transform for the target block may be performed based on the horizontal transform kernel. Here, the horizontal transform may represent a transform for horizontal components of the target block, and the vertical transform may represent a transform for vertical components of the target block. The vertical transform kernel/horizontal transform kernel may be adaptively determined based on a prediction mode and/or a transform index of a target block (CU or sub-block) including a residual block.

Further, according to an example, if the primary transform is performed by applying the MTS, a mapping relationship for transform kernels may be set by setting specific basis functions to predetermined values and combining basis functions to be applied in the vertical transform or the horizontal transform. For example, when the horizontal transform kernel is expressed as trTypeHor and the vertical direction transform kernel is expressed as trTypeVer, a trTypeHor or trTypeVer value of 0 may be set to DCT2, a trTypeHor or trTypeVer value of 1 may be set to DST7, and a trTypeHor or trTypeVer value of 2 may be set to DCT8.

In this case, MTS index information may be encoded and signaled to the decoding apparatus to indicate any one of a plurality of transform kernel sets. For example, an MTS index of 0 may indicate that both trTypeHor and trTypeVer values are 0, an MTS index of 1 may indicate that both trTypeHor and trTypeVer values are 1, an MTS index of 2 may indicate that the trTypeHor value is 2 and the trTypeVer value. Is 1, an MTS index of 3 may indicate that the trTypeHor value is 1 and the trTypeVer value is 2, and an MTS index of 4 may indicate that both both trTypeHor and trTypeVer values are 2.

The transformer may derive modified (secondary) transform coefficients by performing the secondary transform based on the (primary) transform coefficients (S420). The primary transform is a transform from a spatial domain to a frequency domain, and the secondary transform refers to transforming into a more compressive expression by using a correlation existing between (primary) transform coefficients. The secondary transform may include a non-separable transform. In this case, the secondary transform may be called a non-separable secondary transform (NSST), or a mode-dependent non-separable secondary transform (MDNSST). The non-separable secondary transform may represent a transform which generates modified transform coefficients (or secondary transform coefficients) for a residual signal by secondary-transforming, based on a non-separable transform matrix, (primary) transform coefficients derived through the primary transform. At this time, the vertical transform and the horizontal transform may not be applied separately (or horizontal and vertical transforms may not be applied independently) to the (primary) transform coefficients, but the transforms may be applied at once based on the non-separable transform matrix. In other words, the non-separable secondary transform may represent a transform method in which the vertical and horizontal components of the (primary) transform coefficients are not separated, and for example, two-dimensional signals (transform coefficients) are re-arranged to a one-dimensional signal through a certain determined direction (e.g., row-first direction or column-first direction), and then modified transform coefficients (or secondary transform coefficients) are generated based on the non-separable transform matrix. For example, according to a row-first order, M×N blocks are disposed in a line in an order of a first row, a second row, . . . , and an Nth row. According to a column-first order, M×N blocks are disposed in a line in an order of a first column, a second column, . . . , and an Nth column. The non-separable secondary transform may be applied to a top-left region of a block configured with (primary) transform coefficients (hereinafter, may be referred to as a transform coefficient block). For example, if the width (W) and the height (H) of the transform coefficient block are all equal to or greater than 8, an 8×8 non-separable secondary transform may be applied to a top-left 8×8 region of the transform coefficient block. Further, if the width (W) and the height (H) of the transform coefficient block are all equal to or greater than 4, and the width (W) or the height (H) of the transform coefficient block is less than 8, then a 4×4 non-separable secondary transform may be applied to a top-left min(8,W)×min(8,H) region of the transform coefficient block. However, the embodiment is not limited to this, and for example, even if only the condition that the width (W) or height (H) of the transform coefficient block is equal to or greater than 4 is satisfied, the 4×4 non-separable secondary transform may be applied to the top-left min(8,W)×min(8,H) region of the transform coefficient block.

Specifically, for example, if a 4×4 input block is used, the non-separable secondary transform may be performed as follows.

The 4×4 input block X may be represented as follows.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \qquad \text{[Equation 1]}$$

If the X is represented in the form of a vector, the vector $\vec{X}$ may be represented as below.

$$\vec{X} = [X_{00} X_{01} X_{02} X_{03} X_{10} X_{11} X_{12} X_{13} X_{20} X_{21} X_{22} X_{23} X_{30} X_{31} X_{32} X_{33}] \qquad \text{[Equation 2]}$$

In Equation 2, the vector $\vec{X}$ is a one-dimensional vector obtained by rearranging the two-dimensional block X of Equation 1 according to the row-first order.

In this case, the secondary non-separable transform may be calculated as below.

$$\vec{F} = T \cdot \vec{X} \qquad \text{[Equation 3]}$$

In this equation, $\vec{F}$ represents a transform coefficient vector, and T represents a 16×16 (non-separable) transform matrix.

Through foregoing Equation 3, a 16×1 transform coefficient vector $\vec{F}$ may be derived, and the $\vec{F}$ may be re-organized into a 4×4 block through a scan order (horizontal, vertical, diagonal and the like). However, the above-described calculation is an example, and hypercube-Givens transform (HyGT) or the like may be used for the calculation of the non-separable secondary transform in order to reduce the computational complexity of the non-separable secondary transform.

Meanwhile, in the non-separable secondary transform, a transform kernel (or transform core, transform type) may be selected to be mode dependent. In this case, the mode may include the intra prediction mode and/or the inter prediction mode.

As described above, the non-separable secondary transform may be performed based on an 8×8 transform or a 4×4 transform determined based on the width (W) and the height (H) of the transform coefficient block. The 8×8 transform refers to a transform that is applicable to an 8×8 region included in the transform coefficient block when both W and H are equal to or greater than 8, and the 8×8 region may be a top-left 8×8 region in the transform coefficient block. Similarly, the 4×4 transform refers to a transform that is applicable to a 4×4 region included in the transform coefficient block when both W and H are equal to or greater than 4, and the 4×4 region may be a top-left 4×4 region in the transform coefficient block. For example, an 8×8 transform kernel matrix may be a 64×64/16×64 matrix, and a 4×4 transform kernel matrix may be a 16×16/8×16 matrix.

Here, to select a mode-based transform kernel, three non-separable secondary transform kernels may be configured per transform set for the non-separable secondary transform for both the 8×8 transform and the 4×4 transform, and there may be 35 transform sets. That is, 35 transform sets may be configured for the 8×8 transform, and 35 transform sets may be configured for the 4×4 transform. In this case, three 8×8 transform kernels may be included in each of the 35 transform sets for the 8×8 transform, and three 4×4 transform kernels may be included in each of the 35 transform sets for the 4×4 transform. The sizes of the transforms, the numbers of sets, and the numbers of transform kernels in each set mentioned above are merely for illustration. Instead, a size other than 8×8 or 4×4 may be used, n sets may be configured, and k transform kernels may be included in each set.

The transform set may be called an NSST set, and the transform kernel in the NSST set may be called an NSST kernel. The selection of a specific set from among the transform sets may be performed, for example, based on the intra prediction mode of the target block (CU or sub-block).

For reference, as an example, the intra prediction mode may include two non-directional (or non-angular) intra prediction modes and 65 directional (or angular) intra prediction modes. The non-directional intra prediction modes may include a No. 0 planar intra prediction mode, and a No. 1 DC intra prediction mode, and the directional intra prediction modes may include 65 intra prediction modes between a No. 2 intra prediction mode and a No. 66 intra prediction mode. However, this is an example, and the present disclosure may be applied to a case where there are different number of intra prediction modes. Meanwhile, according to circumstances, a No. 67 intra prediction mode may be further used, and the No. 67 intra prediction mode may represent a linear model (LM) mode.

Figure 5:
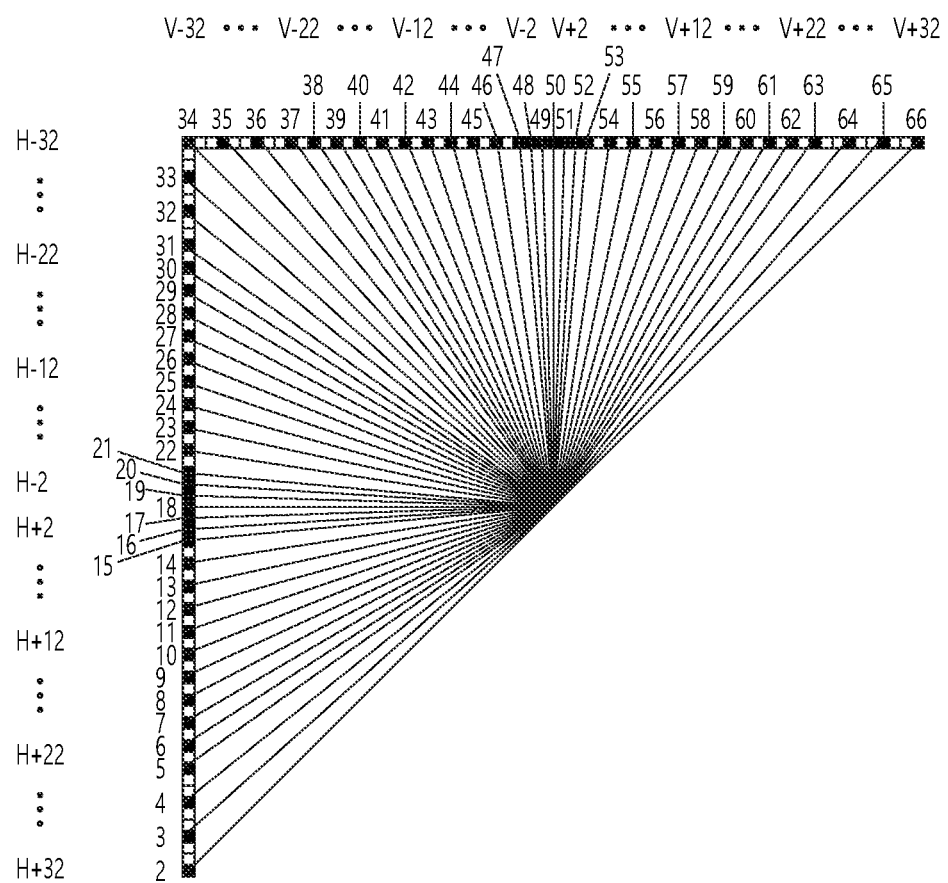
FIG. 5 illustrates directional intra modes of 65 prediction directions.

FIG. 5 illustrates directional intra modes of 65 prediction directions.

Referring to FIG. 5, on the basis of the No. 34 intra prediction mode having a left upward diagonal prediction direction, the intra prediction mode having a horizontal directionality and the intra prediction mode having vertical directionality may be classified. H and V of FIG. 5 mean horizontal directionality and vertical directionality, respectively, and numerals −32 to 32 indicate displacements in 1/32 units on the sample grid position. This may represent an offset for the mode index value. The Nos. 2 to 33 intra prediction modes have the horizontal directionality, and the Nos. 34 to 66 intra prediction modes have the vertical directionality. Meanwhile, strictly speaking, the No. 34 intra prediction mode may be considered as being neither horizontal nor vertical, but it may be classified as belonging to the horizontal directionality in terms of determining the transform set of the secondary transform. This is because the input data is transposed to be used for the vertical direction mode symmetrical on the basis of the No. 34 intra prediction mode, and the input data alignment method for the horizontal mode is used for the No. 34 intra prediction mode. Transposing input data means that rows and columns of two-dimensional block data M×N are switched into N×M data. The No. 18 intra prediction mode and the No. 50 intra prediction mode may represent a horizontal intra prediction mode and a vertical intra prediction mode, respectively, and the No. 2 intra prediction mode may be called a right upward diagonal intra prediction mode because it has a left reference pixel and predicts in a right upward direction. In the same manner, the No. 34 intra prediction mode may be called a right downward diagonal intra prediction mode, and the No. 66 intra prediction mode may be called a left downward diagonal intra prediction mode.

In this case, mapping between the 35 transform sets and the intra prediction modes may be, for example, represented as in the following table. For reference, if an LM mode is applied to a target block, the secondary transform may not be applied to the target block.

TABLE 2

| intra mode | 0  | 1  | 2  | 3  | 4  | 5  | 6  | 7  | 8  | 9  | 10 | 11 | 12 | 13 | 14 | 15 | 16      |
|------------|----|----|----|----|----|----|----|----|----|----|----|----|----|----|----|----|---------|
| set        | 0  | 1  | 2  | 3  | 4  | 5  | 6  | 7  | 8  | 9  | 10 | 11 | 12 | 13 | 14 | 15 | 16      |
| intra mode | 17 | 18 | 19 | 20 | 21 | 22 | 23 | 24 | 25 | 26 | 27 | 28 | 29 | 30 | 31 | 32 | 33      |
| set        | 17 | 18 | 19 | 20 | 21 | 22 | 23 | 24 | 25 | 26 | 27 | 28 | 29 | 30 | 31 | 32 | 33      |
| intra mode | 34 | 35 | 36 | 37 | 38 | 39 | 40 | 41 | 42 | 43 | 44 | 45 | 46 | 47 | 48 | 49 | 50      |
| set        | 34 | 33 | 32 | 31 | 30 | 29 | 28 | 27 | 26 | 25 | 24 | 23 | 22 | 21 | 20 | 19 | 18      |
| intra mode | 51 | 52 | 53 | 54 | 55 | 56 | 57 | 58 | 59 | 60 | 61 | 62 | 63 | 64 | 65 | 66 | 67 (LM) |
| set        | 17 | 16 | 15 | 14 | 13 | 12 | 11 | 10 | 9  | 8  | 7  | 6  | 5  | 4  | 3  | 2  | NULL    |

Meanwhile, if a specific set is determined to be used, one of k transform kernels in the specific set may be selected through the non-separable secondary transform index. The encoding apparatus may derive a non-separable secondary transform index indicating a specific transform kernel based on the rate-distortion (RD) check, and may signal the non-separable secondary transform index to the decoding apparatus. The decoding apparatus may select one from among k transform kernels in the specific set based on the non-separable secondary transform index. For example, the NSST index value 0 may indicate a first non-separable secondary transform kernel, the NSST index value 1 may indicate a second non-separable secondary transform kernel, and the NSST index value 2 may indicate a third non-separable secondary transform kernel. Alternatively, the NSST index value 0 may indicate that the first non-separable secondary transform is not applied to a target block, and the NSST index values 1 to 3 may indicate the three transform kernels.

Referring back to FIG. 4, the transformer may perform the non-separable secondary transform based on the selected transform kernels, and may obtain modified (secondary) transform coefficients. As described above, the modified transform coefficients may be derived as transform coefficients quantized through the quantizer, and may be encoded and signaled to the decoding apparatus and transferred to the dequantizer/inverse transformer in the encoding apparatus.

Meanwhile, as described above, if the secondary transform is omitted, (primary) transform coefficients, which are an output of the primary (separable) transform, may be derived as transform coefficients quantized through the quantizer as described above, and may be encoded and signaled to the decoding apparatus and transferred to the dequantizer/inverse transformer in the encoding apparatus.

The inverse transformer may perform a series of procedures in the inverse order to that in which they have been performed in the above-described transformer. The inverse transformer may receive (dequantized) transformer coefficients, and derive (primary) transform coefficients by performing a secondary (inverse) transform (S450), and may obtain a residual block (residual samples) by performing a primary (inverse) transform on the (primary) transform coefficients (S460). In this connection, the primary transform coefficients may be called modified transform coefficients from the viewpoint of the inverse transformer. As described above, the encoding apparatus and the decoding apparatus may generate the reconstructed block based on the residual block and the predicted block, and may generate the reconstructed picture based on the reconstructed block.

The decoding apparatus may further include a secondary inverse transform application determinator (or an element to determine whether to apply a secondary inverse transform) and a secondary inverse transform determinator (or an element to determine a secondary inverse transform). The secondary inverse transform application determinator may determine whether to apply a secondary inverse transform. For example, the secondary inverse transform may be an NSST or an RST, and the secondary inverse transform application determinator may determine whether to apply the secondary inverse transform based on a secondary transform flag obtained by parsing the bitstream. In another example, the secondary inverse transform application determinator may determine whether to apply the secondary inverse transform based on a transform coefficient of a residual block.

The secondary inverse transform determinator may determine a secondary inverse transform. In this case, the secondary inverse transform determinator may determine the secondary inverse transform applied to the current block based on an NS ST (or RST) transform set specified according to an intra prediction mode. In an embodiment, a secondary transform determination method may be determined depending on a primary transform determination method. Various combinations of primary transforms and secondary transforms may be determined according to the intra prediction mode. Further, in an example, the secondary inverse transform determinator may determine a region to which a secondary inverse transform is applied based on the size of the current block.

Meanwhile, as described above, if the secondary (inverse) transform is omitted, (dequantized) transform coefficients may be received, the primary (separable) inverse transform may be performed, and the residual block (residual samples) may be obtained. As described above, the encoding apparatus and the decoding apparatus may generate the reconstructed block based on the residual block and the predicted block, and may generate the reconstructed picture based on the reconstructed block.

Meanwhile, in the present disclosure, a reduced secondary transform (RST) in which the size of a transform matrix (kernel) is reduced may be applied in the concept of NSST in order to reduce the amount of computation and memory required for the non-separable secondary transform.

Meanwhile, the transform kernel, the transform matrix, and the coefficient constituting the transform kernel matrix, that is, the kernel coefficient or the matrix coefficient, described in the present disclosure may be expressed in 8 bits. This may be a condition for implementation in the decoding apparatus and the encoding apparatus, and may reduce the amount of memory required to store the transform kernel with a performance degradation that can be reasonably accommodated compared to the existing 9 bits or 10 bits. In addition, the expressing of the kernel matrix in 8 bits may allow a small multiplier to be used, and may be more suitable for single instruction multiple data (SIMD) instructions used for optimal software implementation.

In the present specification, the term "RST" may mean a transform which is performed on residual samples for a target block based on a transform matrix whose size is reduced according to a reduced factor. In the case of performing the reduced transform, the amount of computation required for transform may be reduced due to a reduction in the size of the transform matrix. That is, the RST may be used to address the computational complexity issue occurring at the non-separable transform or the transform of a block of a great size.

RST may be referred to as various terms, such as reduced transform, reduced secondary transform, reduction transform, simplified transform, simple transform, and the like, and the name which RST may be referred to as is not limited to the listed examples. Alternatively, since the RST is mainly performed in a low frequency region including a non-zero coefficient in a transform block, it may be referred to as a Low-Frequency Non-Separable Transform (LFNST).

Meanwhile, when the secondary inverse transform is performed based on RST, the inverse transformer 235 of the encoding apparatus 200 and the inverse transformer 322 of the decoding apparatus 300 may include an inverse reduced secondary transformer which derives modified transform coefficients based on the inverse RST of the transform coefficients, and an inverse primary transformer which derives residual samples for the target block based on the inverse primary transform of the modified transform coefficients. The inverse primary transform refers to the inverse transform of the primary transform applied to the residual. In the present disclosure, deriving a transform coefficient based on a transform may refer to deriving a transform coefficient by applying the transform.

FIG. 6 is a diagram illustrating an RST according to an embodiment of the present disclosure.

In the present specification, the term "target block" may mean a current block or a residual block on which coding is performed.

In the RST according to an example, an N-dimensional vector may be mapped to an R-dimensional vector located in another space, so that the reduced transform matrix may be determined, where R is less than N. N may mean the square of the length of a side of a block to which the transform is applied, or the total number of transform coefficients corresponding to a block to which the transform is applied, and the reduced factor may mean an R/N value. The reduced factor may be referred to as a reduced factor, reduction factor, simplified factor, simple factor or other various terms. Meanwhile, R may be referred to as a reduced coefficient, but according to circumstances, the reduced factor may mean R. Further, according to circumstances, the reduced factor may mean the N/R value.

In an example, the reduced factor or the reduced coefficient may be signaled through a bitstream, but the example is not limited to this. For example, a predefined value for the reduced factor or the reduced coefficient may be stored in each of the encoding apparatus 200 and the decoding apparatus 300, and in this case, the reduced factor or the reduced coefficient may not be signaled separately.

The size of the reduced transform matrix according to an example may be R×N less than N×N, the size of a conventional transform matrix, and may be defined as in Equation 4 below.

$$T_{R\times N} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix} \quad \text{[Equation 4]}$$

The matrix T in the Reduced Transform block shown in FIG. 6A may mean the matrix TR×N of Equation 4. As shown in FIG. 6A, when the reduced transform matrix TR×N is multiplied to residual samples for the target block, transform coefficients for the target block may be derived.

In an example, if the size of the block to which the transform is applied is 8×8 and R=16 (i.e., R/N=16/64=¼), then the RST according to FIG. 6A may be expressed as a matrix operation as shown in Equation 5 below. In this case, memory and multiplication calculation can be reduced to approximately ¼ by the reduced factor.

$$\begin{bmatrix} t_{1,1} & t_{1,2} & t_{1,3} & \cdots & t_{1,64} \\ t_{2,1} & t_{1,2} & t_{1,3} & & t_{2,64} \\ \vdots & & & \ddots & \vdots \\ t_{16,1} & t_{16,2} & t_{16,3} & \cdots & t_{16,64} \end{bmatrix} \times \begin{bmatrix} r_1 \\ r_2 \\ \vdots \\ r_{64} \end{bmatrix} \quad \text{[Equation 5]}$$

In Equation 5, $r_1$ to $r_{64}$ may represent residual samples for the target block and may be specifically transform coefficients generated by applying a primary transform. As a result of the calculation of Equation 5, transform coefficients $c_i$ for the target block may be derived, and a process of deriving $c_i$ may be as in Equation 6.

for $i$ from to $R$:    [Equation 6]

$ci = 0$ for $j$ from 1 to $N$ $ci\mathrel{+}= tij \star rj$

As a result of the calculation of Equation 6, transform coefficients $c_1$ to $c_R$ for the target block may be derived. That is, when R=16, transform coefficients $c_1$ to $c_{16}$ for the target block may be derived. If, instead of RST, a regular transform is applied and a transform matrix of 64×64 (N×N) size is multiplied to residual samples of 64×1 (N×1) size, then only 16 (R) transform coefficients are derived for the target block because RST was applied, although 64 (N) transform coefficients are derived for the target block. Since the total number of transform coefficients for the target block is reduced from N to R, the amount of data transmitted by the encoding apparatus 200 to the decoding apparatus 300 decreases, so efficiency of transmission between the encoding apparatus 200 and the decoding apparatus 300 can be improved.

When considered from the viewpoint of the size of the transform matrix, the size of the regular transform matrix is 64×64 (N×N), but the size of the reduced transform matrix is reduced to 16×64 (R×N), so memory usage in a case of performing the RST can be reduced by an R/N ratio when compared with a case of performing the regular transform. In addition, when compared to the number of multiplication calculations N×N in a case of using the regular transform matrix, the use of the reduced transform matrix can reduce the number of multiplication calculations by the R/N ratio (R×N).

In an example, the transformer 232 of the encoding apparatus 200 may derive transform coefficients for the target block by performing the primary transform and the RST-based secondary transform on residual samples for the target block. These transform coefficients may be transferred to the inverse transformer of the decoding apparatus 300, and the inverse transformer 322 of the decoding apparatus 300 may derive the modified transform coefficients based on the inverse reduced secondary transform (RST) for the transform coefficients, and may derive residual samples for the target block based on the inverse primary transform for the modified transform coefficients.

The size of the inverse RST matrix $T_{N\times R}$ according to an example is N×R less than the size N×N of the regular inverse transform matrix, and is in a transpose relationship with the reduced transform matrix $T_{R\times N}$ shown in Equation 4.

The matrix Tt in the Reduced Inv. Transform block shown in FIG. 6B may mean the inverse RST matrix $T_{R\times N}{}^T$ (the superscript T means transpose). When the inverse RST matrix $T_{R\times N}{}^T$ is multiplied to the transform coefficients for the target block as shown in FIG. 6B, the modified transform coefficients for the target block or the residual samples for the target block may be derived. The inverse RST matrix $T_{R\times N}{}^T$ may be expressed as $(T_{R\times N}{}^T)_{N\times R}$.

More specifically, when the inverse RST is applied as the secondary inverse transform, the modified transform coefficients for the target block may be derived when the inverse RST matrix $T_{R\times N}{}^T$ is multiplied to the transform coefficients for the target block. Meanwhile, the inverse RST may be applied as the inverse primary transform, and in this case, the residual samples for the target block may be derived when the inverse RST matrix $T_{R\times N}{}^T$ is multiplied to the transform coefficients for the target block.

In an example, if the size of the block to which the inverse transform is applied is 8×8 and R=16 (i.e., R/N=16/64=¼), then the RST according to FIG. 6B may be expressed as a matrix operation as shown in Equation 7 below.

$$\begin{bmatrix} t_{1,1} & t_{2,1} & & t_{16,1} \\ t_{1,2} & t_{2,2} & \cdots & t_{16,2} \\ t_{1,3} & t_{2,3} & & t_{16,3} \\ \vdots & \vdots & & \vdots \\ & \vdots & \ddots & \vdots \\ t_{1,64} & t_{2,64} & \cdots & t_{16,64} \end{bmatrix} \times \begin{bmatrix} c_1 \\ c_{11} \\ \vdots \\ c_{16} \end{bmatrix} \quad \text{[Equation 7]}$$

In Equation 7, $c_1$ to $c_{16}$ may represent the transform coefficients for the target block. As a result of the calculation of Equation 7, $r_j$ representing the modified transform coefficients for the target block or the residual samples for the target block may be derived, and the process of deriving $r_j$ may be as in Equation 8.

for $i$ from to $N$:    [Equation 8]

$r_j = 0$ for $j$ from 1 to $R$ $r_j \mathrel{+}= t_{j,i} \star c_i$

As a result of the calculation of Equation 8, $r_1$ to $r_N$ representing the modified transform coefficients for the target block or the residual samples for the target block may be derived. When considered from the viewpoint of the size of the inverse transform matrix, the size of the regular inverse transform matrix is 64×64 (N×N), but the size of the reduced inverse transform matrix is reduced to 64×16 (R×N), so memory usage in a case of performing the inverse RST can be reduced by an R/N ratio when compared with a case of performing the regular inverse transform. In addition, when compared to the number of multiplication calculations N×N in a case of using the regular inverse transform matrix, the use of the reduced inverse transform matrix can reduce the number of multiplication calculations by the R/N ratio (N×R).

A transform set configuration shown in Table 2 may also be applied to an 8×8 RST. That is, the 8×8 RST may be applied according to a transform set in Table 2. Since one transform set includes two or three transforms (kernels) according to an intra prediction mode, it may be configured to select one of up to four transforms including that in a case where no secondary transform is applied. In a transform where no secondary transform is applied, it may be considered to apply an identity matrix. Assuming that indexes 0, 1, 2, and 3 are respectively assigned to the four transforms (e.g., index 0 may be allocated to a case where an identity matrix is applied, that is, a case where no secondary transform is applied), an NSST index as a syntax element may be signaled for each transform coefficient block, thereby designating a transform to be applied. That is, through the NSST index, it is possible to designate an 8×8 NSST for a top-left 8×8 block and to designate an 8×8 RST in an RST configuration. The 8×8 NSST and the 8×8 RST refer to transforms applicable to an 8×8 region included in the transform coefficient block when both W and H of the target block to be transformed are equal to or greater than 8, and the 8×8 region may be a top-left 8×8 region in the transform coefficient block. Similarly, a 4×4 NS ST and a 4×4 RST refer to transforms applicable to a 4×4 region included in the transform coefficient block when both W and H of the target block to are equal to or greater than 4, and the 4×4 region may be a top-left 4×4 region in the transform coefficient block.

If the (forward) 8×8 RST illustrated in Equation 4 is applied, 16 valid transform coefficients are generated. Thus, it is considered that 64 pieces of input data forming the 8×8 region is reduced to 16 pieces of output data, and only ¼ of the region is filled with valid transform coefficients from the perspective of a two-dimensional region. Accordingly, the 16 pieces of output data obtained by applying the forward 8×8 RST may fill the top-left region (transform coefficients 1 to 16) of the block as shown in FIG. 7.

Figure 7:
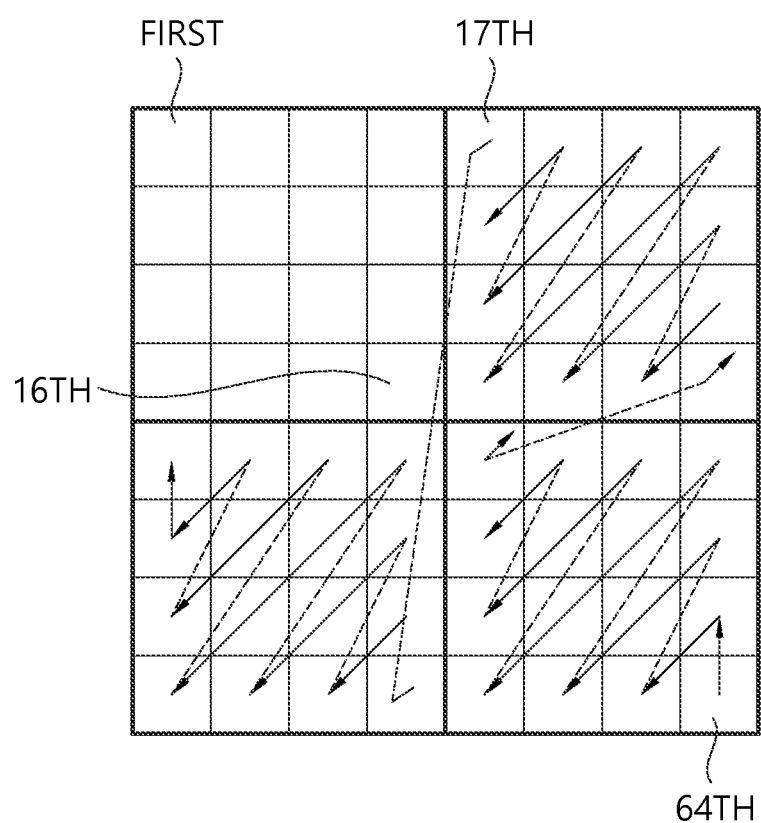
FIG. 7 is a diagram illustrating a transform coefficient scanning order according to an embodiment of the present disclosure.

FIG. 7 is a diagram illustrating a transform coefficient scanning order according to an embodiment of the present disclosure. As described above, when the forward scanning order starts from a first transform coefficient, reverse scanning may be performed in directions and orders indicated by arrows shown in FIG. 7 from 64th to 17th transform coefficients in the forward scanning order.

In FIG. 7, a top-left 4×4 region is a region of interest (ROI) filled with valid transform coefficients, and the remaining region is empty. The empty region may be filled with 0s by default.

That is, when an 8×8 RST with a 16×64 forward transform matrix is applied to the 8×8 region, output transform coefficients may be arranged in the top-left 4×4 region, and the region where no output transform coefficient exists may be filled with 0s (from the 64th to 17th transform coefficients) according to the scanning order of FIG. 7.

If a non-zero valid transform coefficient is found outside the ROI of FIG. 7, it is certain that the 8×8 RST has not been applied, and thus NSST index coding may be omitted. On the contrary, if a non-zero transform coefficient is not found outside the ROI of FIG. 7 (e.g., if a transform coefficient is set to 0 in a region other than the ROI in a case where the 8×8 RST is applied), the 8×8 RST is likely to have been applied, and thus NSST index coding may be performed. This conditional NSST index coding may be performed after a residual coding process because it is necessary to check the presence or absence of a non-zero transform coefficient.

The present disclosure discloses methods for optimizing a design and an association of an RST that can be applied to a 4×4 block from an RST structure described in this embodiment. Some concepts can be applied not only to a 4×4 RST but also to an 8×8 RST or other types of transforms.

Figure 8:
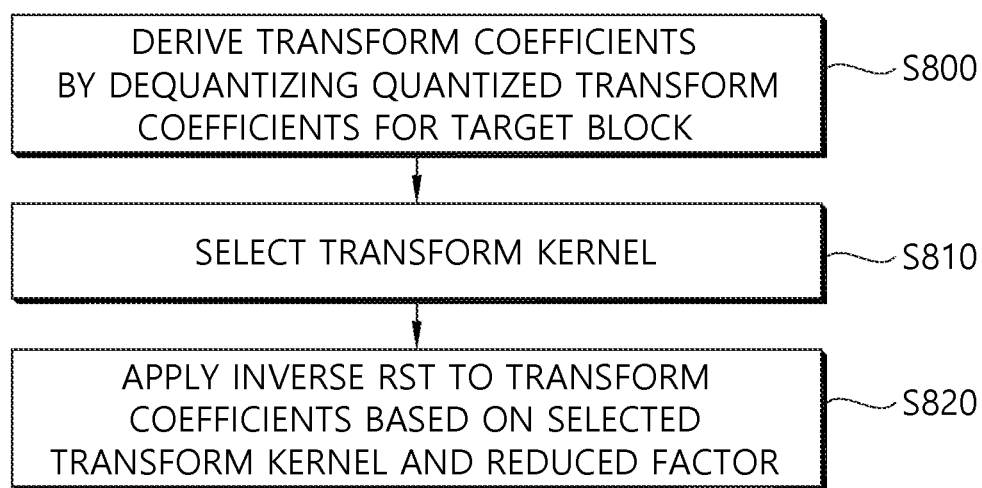
FIG. 8 is a flowchart illustrating an inverse RST process according to an embodiment of the present disclosure.

FIG. 8 is a flowchart illustrating an inverse RST process according to an embodiment of the present disclosure.

Each operation disclosed in FIG. 8 may be performed by the decoding apparatus 300 illustrated in FIG. 3. Specifically, S800 may be performed by the dequantizer 321 illustrated in FIG. 3, and S810 and S820 may be performed by the inverse transformer 322 illustrated in FIG. 3. Therefore, a description of specific details overlapping with those explained above with reference to FIG. 3 will be omitted or will be made briefly. In the present disclosure, an RST may be applied to a transform in a forward direction, and an inverse RST may mean a transform applied to an inverse direction.

In an embodiment, the specific operations according to the inverse RST may be different from the specific operations according to the RST only in that their operation orders are opposite to each other, and the specific operations according to the inverse RST may be substantially similar to the specific operations according to the RST. Accordingly, a person skilled in the art will readily understand that the descriptions of S800 to S820 for the inverse RST described below may be applied to the RST in the same or similar manner.

The decoding apparatus 300 according to an embodiment may derive the transform coefficients by performing dequantization on the quantized transform coefficients for the target block (S800).

The decoding apparatus 300 may determine whether to apply an inverse secondary transform after an inverse primary transform and before the inverse secondary transform. For example, the inverse secondary transform may be an NSST or an RST. For example, the decoding apparatus may determine whether to apply the inverse secondary transform based on a secondary transform flag parsed from a bitstream. In another example, the decoding apparatus may determine whether to apply the inverse secondary transform based on a transform coefficient of a residual block.

The decoding apparatus 300 may determine an inverse secondary transform. In this case, the decoding apparatus 300 may determine the secondary inverse transform applied to the current block based on an NSST (or RST) transform set specified according to an intra prediction mode. In an embodiment, a secondary transform determination method may be determined depending on a primary transform determination method. For example, it may be determined to apply an RST or LFNST only when DCT-2 is applied as a transform kernel in the primary transform. Alternatively, various combinations of primary transforms and secondary transforms may be determined according to the intra prediction mode.

Further, in an example, the decoding apparatus 300 may determine a region to which the inverse secondary transform is applied based on the size of the current block before determining the inverse secondary transform.

The decoding apparatus 300 according to an embodiment may select a transform kernel (S810). More specifically, the decoding apparatus 300 may select the transform kernel based on at least one of informations on a transform index, a width and height of a region to which the transform is applied, an intra prediction mode used in image decoding, and a color component of the target block. However, the example is not limited to this, and for example, the transform kernel may be predefined, and separate information for selecting the transform kernel may not be signaled.

In one example, information on the color component of the target block may be indicated through CIdx. If the target block is a luma block, CIdx may indicate 0, and if the target block is a chroma block, for example, a Cb block or a Cr block, then CIdx may indicate a non-zero value (for example, 1).

The decoding apparatus 300 according to an embodiment may apply the inverse RST to transform coefficients based on the selected transform kernel and the reduced factor (S820).

Hereinafter, a method for determining a secondary NSST set, that is, a secondary transform set or a transform set, in view of an intra prediction mode and the size of a block according to an embodiment of the present disclosure is proposed.

In an embodiment, a set for a current transform block may be configured based on the intra prediction mode described above, thereby applying a transform set including transform kernels having various sizes to the transform block. Transform sets in Table 3 are expressed using 0 to 3 as in Table 4.

Various numbers of transform kernel matrices that may be included in each transform set may be set as shown in the following tables.

TABLE 5

| NSST Set | 0 (DC, Planar) | 1 | 2 | 3 |
|---|---|---|---|---|
| # of transform kernels | 2 | 2 | 2 | 2 |

TABLE 6

| NSST Set | 0 (DC, Planar) | 1 | 2 | 3 |
|---|---|---|---|---|
| # of transform kernels | 2 | 1 | 1 | 1 |

TABLE 7

| NSST Set | 0 (DC, Planar) | 1 | 2 | 3 |
|---|---|---|---|---|
| # of transform kernels | 1 | 1 | 1 | 1 |

According to Table 5, two available transform kernels are used for each transform set, and accordingly a transform index ranges from 0 to 2.

According to Table 6, two available transform kernels are used for transform set 0, that is, a transform set according to a DC mode and a planar mode among intra prediction modes, and one transform kernel is used for each of the remaining transform sets. Here, an available transform index for transform set 1 ranges from 0 to 2, and a transform index for the remaining transform sets 1 to 3 ranges from 0 to 1.

According to Table 7, one available transform kernel is used for each transform set, and accordingly a transform index ranges from 0 to 1.

TABLE 3

| Intra mode | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| NSST Set | 0 | 0 | 2 | 2 | 2 | 2 | 2 | 2 | 2 | 2 | 2 | 2 | 2 | 18 | 18 | 18 | 18 |
| Intra mode | 17 | 18 | 19 | 20 | 21 | 22 | 23 | 24 | 25 | 26 | 27 | 28 | 29 | 30 | 31 | 32 | 33 |
| NSST Set | 18 | 18 | 18 | 18 | 18 | 18 | 18 | 34 | 34 | 34 | 34 | 34 | 34 | 34 | 34 | 34 | 34 |
| Intra mode | 34 | 35 | 36 | 37 | 38 | 39 | 40 | 41 | 42 | 43 | 44 | 45 | 46 | 47 | 48 | 49 | 50 |
| NSST Set | 34 | 34 | 34 | 34 | 34 | 34 | 34 | 34 | 34 | 34 | 34 | 18 | 18 | 18 | 18 | 18 | 18 |
| Intra mode | 51 | 52 | 53 | 54 | 55 | 56 | 57 | 58 | 59 | 60 | 61 | 62 | 63 | 64 | 65 | 66 | |
| NSST Set | 18 | 18 | 18 | 18 | 18 | 2 | 2 | 2 | 2 | 2 | 2 | 2 | 2 | 2 | 2 | 2 | |

TABLE 4

| Intra mode | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| NSST Set | 0 | 0 | 1 | 1 | 1 | 1 | 1 | 1 | 1 | 1 | 1 | 1 | 1 | 2 | 2 | 2 | 2 |
| Intra mode | 17 | 18 | 19 | 20 | 21 | 22 | 23 | 24 | 25 | 26 | 27 | 28 | 29 | 30 | 31 | 32 | 33 |
| NSST Set | 2 | 2 | 2 | 2 | 2 | 2 | 2 | 3 | 3 | 3 | 3 | 3 | 3 | 3 | 3 | 3 | 3 |
| Intra mode | 34 | 35 | 36 | 37 | 38 | 39 | 40 | 41 | 42 | 43 | 44 | 45 | 46 | 47 | 48 | 49 | 50 |
| NSST Set | 3 | 3 | 3 | 3 | 3 | 3 | 3 | 3 | 3 | 3 | 3 | 2 | 2 | 2 | 2 | 2 | 2 |
| Intra mode | 51 | 52 | 53 | 54 | 55 | 56 | 57 | 58 | 59 | 60 | 61 | 62 | 63 | 64 | 65 | 66 | |
| NSST Set | 2 | 2 | 2 | 2 | 2 | 1 | 1 | 1 | 1 | 1 | 1 | 1 | 1 | 1 | 1 | 1 | |

Indexes 0, 2, 18, and 34 illustrated in Table 3 correspond to 0, 1, 2, and 3 in Table 4, respectively. In Table 3 and Table 4, only four transform sets are used instead of 35 transform sets, thereby significantly reducing memory space.

In transform set mapping of Table 3, a total of four transform sets may be used, and the four transform sets may be rearranged to be distinguished by indexes 0, 1, 2, and 3 as shown in Table 4. Table 8 and Table 9 illustrate four transform sets available for secondary transform, wherein Table 8 presents transform kernel matrices applicable to an 8×8 block, and Table 9 presents transform kernel matrices applicable to a 4×4 block. Table 8 and Table 9 include two transform kernel matrices per transform set, and two transform kernel matrices may be applied to all intra prediction modes as shown in Table 5.

TABLE 8

```
const int g_aiNsst8x8[4][2][16][64] = {
  { //0
    {
      {-118,22,21,3,4,1,2,1,31,-17,-3,0,-1,0,0,0,16,0,-4,0,-1,0,0,0,2,0,0,0,0,0,0,0,3,0,
-1,0,0,0,0,0,1,0,0,0,0,0,0,1,0,0,0,0,0,0,0,0,0,0,0,0,0,0,0,0},
      {-22,-88,46,0,9,0,3,0,-60,29,-7,3,0,1,0,0,35,2,-8,-1,-2,0,-1,0,-3,3,0,0,0,0,0,0,7,2,-2,
-1,0,0,0,0,-1,1,0,0,0,0,0,0,3,1,-1,0,0,0,0,0,0,0,0,0,0,0,0,0},
      {-10,68,-13,-7,-3,-2,-1,-1,-90,1,32,-1,4,0,2,0,32,-32,-3,4,-1,1,0,0,7,2,-5,0,0,0,0,0,6,-3,
0,0,0,0,0,0,0,1,0,-1,0,0,0,0,0,2,-1,0,0,0,0,0,0,1,0,0,0,0,0,0,0},
      {16,-16,12,1,-1,0,0,0,-10,-111,20,18,4,4,2,1,20,24,-33,-1,0,0,0,0,-4,17,1,-7,0,-1,
0,0,0,4,0,0,0,0,0,0,-1,3,0,-1,0,0,0,0,0,1,0,0,0,0,0,0,-1,1,0,0,0,0,0,0},
      {-31,-40,-94,48,-5,10,-2,4,-25,-13,15,-14,6,-2,2,-1,-18,17,19,-9,-1,-1,0,-1,15,-5,-3,2,-1,
0,0,0,0,4,2,-2,0,0,0,0,3,0,0,0,0,0,0,0,1,1,-1,0,0,0,0,1,0,0,0,0,0,0,0},
      {13,3,-42,11,-2,3,-1,1,31,16,-15,-5,-2,-1,-1,0,99,4,-10,-5,-4,-1,-2,-1,-49,
10,13,0,2,0,1,0,6,-5,3,0,0,0,0,0,-9,1,2,0,0,0,0,0,3,-1,-1,0,0,0,0,0,-4,0,1,0,0,0,0,0},
      {3,-32,-2,-2,2,0,1,0,37,-2,70,-15,-3,-3,-1,-1,9,-81,-2,28,-2,4,0,2,8,20,-30,-1,3,-1,0,0,-5,
4,3,-4,1,0,0,0,1,3,-4,0,0,0,0,0,-1,0,1,0,0,0,0,0,0,1,-2,0,0,0,0,0},
      {0,6,13,-7,-1,-1,0,0,10,30,89,-20,-3,-5,0,-2,6,76,-13,4,-3,-2,-1,-1,-5,-27,0,5,3,1,1,1,-1,-3,-7,
2,1,1,0,0,0,-4,-1,1,0,0,0,0,0,1,-1,1,0,0,0,0,0,-2,-1,0,0,0,0,0,0},
      {-13,-18,-41,108,26,-10,7,-3,-6,-12,-4,-7,-11,3,-1,1,-5,8,21,20,-9,0,-1,0,-15,-3,5,4,2,-1,
0,0,5,-1,0,3,-1,0,0,0,-2,0,1,0,0,0,0,0,1,0,0,2,0,0,0,0,-1,0,0,0,0,0,0,0},
      {9,2,-10,-18,4,-1,1,0,13,8,-16,0,-2,1,0,0,44,19,-11,-3,-4,-1,-1,0,107,9,-17,-2,-5,-1,-2,0,-27,
10,9,0,1,0,0,0,10,-3,0,1,0,0,0,0,-7,1,2,1,0,0,0,0,3,-1,0,0,0,0,0,0},
      {12,1,27,11,0,0,0,0,2,-33,-6,-43,8,-2,2,0,28,-4,83,-5,-16,0,-2,0,5,-48,-15,36,1,2,0,1,2,6,-18,
-6,4,0,1,0,-1,-2,2,2,-1,0,0,0,1,2,-2,-1,0,0,0,0,0,0,1,0,0,0,0,0},
      {0,3,4,0,9,-4,2,-1,4,7,21,68,-14,5,-3,2,7,18,66,-37,7,-4,1,-1,-5,47,-42,-14,4,0,0,0,7,-21,-1,
9,-1,1,0,0,-3,6,-3,-2,1,0,0,0,2,-3,1,1,0,0,0,0,-1,2,-1,-1,0,0,0,0},
      {0,-8,-14,-2,-2,-1,-1,0,8,0,6,78,-8,3,-3,1,11,-20,-13,5,18,-1,2,0,6,-88,-3,0,2,6,0,2,5,13,-23,
-4,-1,0,0,0,-1,-3,5,-6,-1,0,0,0,1,3,-3,0,0,0,0,0,-1,-1,-2,0,0,0,0,0},
      {5,3,-3,-1,2,0,0,0,8,3,-1,-9,-1,1,0,0,-2,2,-9,-3,2,-1,1,0,28,17,-1,2,-1,-1,0,0,108,25,-36,-6,-4,
-1,-2,0,-32,2,13,-2,0,0,0,0,11,-1,-3,1,0,0,0,0,-4,1,1,0,0,0,0,0},
      {6,9,-1,31,108,-27,11,-4,-1,-1,-2,-31,15,-4,2,-4,-4,-11,-6,-33,3,0,0,1,-8,6,-1,10,-4,0,0,-2,
2,1,0,-1,1,0,0,1,0,0,0,1,0,0,0,0,0,-1,0,-1,0,0,0,0,0,0,1,0,0,0,0},
      {1,-8,3,-12,1,-1,0,0,7,-4,25,-6,0,0,1,-1,3,-27,10,-72,8,-1,1,0,16,-7,77,-8,-32,3,-5,1,1,-7,
3,42,-7,-3,0,-1,0,-2,-3,2,5,-1,1,0,0,-2,0,4,-1,0,0,0,1,0,-1,0,1,0,0,0},
    },
    {
      {108,-48,-10,-1,-2,-1,-1,0,-45,6,9,1,1,0,1,0,-9,10,1,-1,0,0,0,0,-3,1,-1,0,0,0,0,0,-2,
1,0,0,0,0,0,0,-1,1,0,0,0,0,0,0,-1,1,0,0,0,0,0,0,0,0,0,0,0,0,0,0},
      {54,60,-38,-6,-6,-1,-2,0,71,-32,-20,5,-1,1,-1,0,-34,-19,15,5,1,1,1,0,-8,4,5,-2,0,0,0,0,-7,
0,2,0,0,0,0,0,-1,1,1,0,0,0,0,0,-2,-1,1,0,0,0,0,-1,0,0,0,0,0,0,0,0},
      {-3,-88,29,12,5,1,2,1,83,-1,-7,-5,-5,-1,-1,0,-16,6,-1,-2,1,0,0,0,-12,6,2,0,1,0,0,0,-5,5,-1,-1,
0,0,0,0,-2,1,0,0,0,0,0,0,-1,1,0,0,0,0,0,0,-1,0,0,0,0,0,0,0},
      {25,24,34,-21,0,-4,0,-2,20,87,-33,-20,-2,-3,-1,-1,29,-29,-38,10,3,2,0,1,-15,-20,
8,11,0,1,0,0,-1,-4,3,2,-1,0,0,0,-3,-2,2,1,0,0,0,0,-1,0,0,0,0,0,0,-1,-1,1,0,0,0,0,0},
      {7,23,93,-32,-3,-6,1,-3,-14,-19,10,-14,3,0,1,0,-68,0,0,5,7,1,1,0,16,16,-7,0,0,-1,0,0,3,0,-8,
1,0,0,0,0,0,4,1,-2,1,0,0,0,0,0,-1,-2,1,0,0,0,0,2,0,-1,0,0,0,0,0},
      {22,9,46,-17,-2,-3,0,-1,10,-70,5,7,4,2,1,1,86,-2,-19,0,-3,0,-1,0,-21,0,1,0,1,0,0,0,-5,
5,0,0,1,0,0,0,-4,2,0,-1,0,0,0,0,1,1,0,0,0,0,0,0,-2,1,0,0,0,0,0,0},
      {-12,-27,1,-15,8,-2,2,-1,-30,-16,-70,25,7,3,1,2,-4,-68,27,35,-4,3,0,1,-8,22,32,-11,-8,-1,-1,
-1,5,6,-3,-8,-1,1,0,0,0,3,2,-2,1,0,0,0,2,0,0,0,0,0,0,0,1,1,-1,0,0,0,0,0},
      {-2,-6,-12,-53,10,-3,3,-1,4,-5,-68,6,15,0,2,1,6,77,-5,13,-4,-3,-1,-1,40,-6,-17,3,-6,1,-1,0,-3,
-12,4,7,-1,1,0,0,2,-1,3,0,-1,0,0,0,-2,0,2,1,0,0,0,0,1,-1,1,0,0,0,0,0},
      {6,6,13,86,-12,2,-5,2,-14,-28,-50,-16,-8,4,1,1,-12,2,-52,-3,14,3,1,1,29,-17,4,19,-2,-1,-1,
0,-1,-4,11,-2,-2,1,0,0,1,0,3,0,0,-1,0,0,-2,1,1,-1,0,0,0,0,1,0,1,0,0,0,0,0},
      {16,22,37,52,0,-2,-2,0,10,33,-14,44,-11,0,-2,1,25,25,58,-10,-20,-1,-2,-1,23,30,-5,-36,-3,-1,
0,-1,2,-6,-15,-6,4,1,1,0,-1,0,0,-2,1,1,0,0,0,0,-2,-1,-1,1,0,0,0,0,0,-1,0,0,0,0},
      {8,-13,-8,-13,0,0,0,0,18,-1,28,-5,0,-1,0,0,22,-51,-5,10,2,2,0,1,104,4,-24,0,-3,-1,-2,0,8,-10,
-5,2,0,0,0,0,-2,0,4,0,0,0,0,0,-4,0,1,0,0,0,0,0,1,1,0,0,0,0,0,0,0},
      {0,0,-8,0,-27,5,-3,1,-4,-1,-18,-96,-10,11,2,0,22,6,35,-8,28,-1,-1,-1,-1,50,1,-6,4,-10,0,-1,
2,1,-20,3,4,-1,1,0,-1,0,2,6,0,-1,0,0,0,1,-2,-2,1,1,0,0,0,-1,0,1,2,0,0,0,0},
      {-3,-7,0,-10,-2,1,1,0,-9,-5,-30,11,-14,4,-3,1,-5,-29,6,-66,-9,5,0,1,-13,-7,-62,-3,51,2,3,1,-1,
-9,2,49,8,-9,2,-1,0,0,5,2,-8,-1,-1,0,0,-3,1,4,0,-1,0,0,0,0,1,1,0,-2,0,1,0},
      {1,-5,16,-1,-18,3,-1,0,-2,-8,-3,-24,-11,7,0,0,4,-3,66,-1,1,1,-2,0,10,-95,21,2,0,0,0,0,2,-12,-17,
23,-3,3,0,1,0,3,4,-2,-2,2,-1,0,0,-3,3,2,0,0,0,0,0,1,0,-1,-1,1,0,0,0},
      {-6,-7,-2,-18,-100,25,-3,3,3,1,6,1,41,-34,20,-5,1,-2,6,-16,14,34,-1,-3,0,0,3,1,-11,7,-6,0,1,-1,
2,-1,-6,5,-2,0,0,0,0,1,-2,2,-1,0,0,0,0,0,2,0,0,0,0,0,0,0,1,0,0,0,0},
      {-1,-1,1,22,3,-6,-2,0,-1,0,5,0,16,-2,3,0,1,-4,13,75,29,-1,-1,-1,-28,-16,-75,-2,-14,-4,1,0,-14,
-23,-25,20,1,4,1,1,1,3,13,3,-6,0,0,0,0,-2,-1,0,0,0,0,0,-1,0,1,0,-2,0,0,0},
    }
  },
  { //1
    {
      {-98,54,-1,4,0,1,0,1,56,-9,-13,0,-2,0,-1,0,3,-18,3,3,0,0,0,0,2,0,5,-1,0,0,0,0,0,-2,0,-1,
0,0,0,0,0,1,0,1,0,0,0,0,0,-1,0,0,0,0,0,0,0,0,0,0,0,0,0,0},
```

TABLE 8-continued

{64,9,−18,0,−4,0,−1,0,86,−48,−13,2,−2,0,−1,0,−28,−22,17,3,2,1,1,0,−11,8,8,−3,0,−1,0,0,−10,
3,0,−1,1,0,0,0,−3,3,1,0,0,0,0,0,−4,1,0,0,0,0,0,0,−2,1,0,0,0,0,0,0,},
{−17,18,−11,4,−3,2,−1,1,−29,−65,40,2,5,1,2,0,−54,53,32,−15,2,−3,1,−1,16,27,−24,−13,1,−1,
0,0,0,−1,−12,4,4,0,1,0,6,1,−4,3,0,0,0,0,0,0,−1,1,0,0,0,0,3,0,−1,1,−1,0,0,0,0},
{−35,−98,50,−1,8,0,3,0,38,−9,21,−9,0,−2,0,−1,−8,3,7,−8,1,−1,0,0,0,−11,19,1,−6,2,−1,0,0,−2,9,−9,−2,
2,0,0,0,−2,4,−3,2,1,0,0,0,0,2,−2,1,−1,−1,0,0,−1,1,−1,0,0,0,0,0},
{7,0,−10,1,−1,0,0,0,45,8,32,−15,2,−4,1,−2,14,61,−55,−19,2,−3,0,−1,15,−40,−41,30,5,3,1,1,−4,−13,
20,19,−8,−1,−1,0,2,−6,6,−4,−8,2,0,0,−3,−2,4,−3,1,3,0,0,0,−1,1,0,1,0,−1,0},
{−3,−9,−20,8,−4,3,−1,1,−7,−59,30,12,0,3,0,1,96,−9,24,−15,−6,−2,−1,−1,−10,−22,2,−16,4,0,1,0,−6,
6,6,−2,8,0,1,0,−5,4,0,−1,2,−2,0,−1,−1,3,0,0,1,−1,0,0,−2,1,−1,−1,0,0,0,0},
{−19,−25,−25,13,0,3,0,1,−25,−43,4,6,2,0,1,0,−36,−23,−29,22,4,3,1,1,−7,−36,39,44,−5,3,−1,
1,2,18,49,−8,−20,−3,−3,−1,4,7,4,−22,−8,2,0,0,0,4,1,−10,2,3,1,0,1,2,0,−4,3,1,0,0},
{4,7,−11,9,−2,4,−1,1,10,10,37,−19,−2,−4,0,−1,−1,15,−25,8,1,3,−1,1,27,−10,49,−11,−19,0,−4,0,−6,
15,−21,−66,16,9,2,1,−7,−4,−31,21,43,−5,2,0,−2,7,0,21,−6,−13,0,−2,0,−2,−4,3,−5,0,2,0},
{6,34,16,−1,−1,1,0,0,−5,17,58,−21,−1,−3,1,−1,−11,−25,−12,−35,7,−3,2,−1,−80,7,1,8,19,0,4,0,−5,
39,−2,7,−2,−5,0,−1,1,6,−13,0,−5,1,0,0,4,1,−5,1,0,2,−1,0,0,−2,−3,1,0,0,−1,0},
{−16,−34,−96,25,−6,6,−3,2,12,46,16,28,−8,3,−2,1,−13,−2,19,−16,−8,0,−1,0,−15,12,−4,−9,
7,1,1,0,4,0,−9,5,2,−1,0,0,0,−4,4,4,−2,0,0,0,1,1,2,−2,−1,0,0,0,−1,−1,0,1,0,0,0,0},
{−1,−5,−23,1,5,−1,0,0,−5,−25,−5,−17,9,−4,1,−1,26,−17,−44,8,24,−2,4,0,10,69,−6,41,1,−10,0,−2,
22,7,−39,7,−27,−6,−3,−1,−10,−30,−6,13,−9,8,2,2,2,−2,10,6,−2,4,0,0,−1,−1,4,4,−2,1,−1,0,},
{10,14,16,7,−5,−1,0,−1,17,25,27,17,−7,0,0,−1,19,29,34,11,−11,−2,−1,−1,17,34,29,11,−18,−6,
−3,−2,16,17,22,−20,−43,−10,−6,−2,−2,−8,−11,−52,−28,7,1,2,−2,−8,−11,−24,10,14,4,3,0,0,−3,−7,11,4,0,0,},
{7,3,13,7,−3,3,0,1,0,8,54,−9,−8,0,−1,0,−14,−68,6,−31,1,1,1,0,65,−9,−2,−2,14,1,2,0,26,−32,
4,9,1,−3,0,−1,−2,−12,21,−1,−4,0,0,0,−2,4,3,−9,1,1,0,−1,−1,2,−2,0,2,0,0,0},
{1,1,−4,21,−9,0,−2,1,1,−1,−15,−32,14,−2,4,−2,−1,6,−20,48,−17,0,−3,1,7,−11,32,−47,5,6,0,1,−12,
20,−32,36,20,−19,4,−4,8,−8,19,8,−51,8,−3,0,−1,−3,−2,−26,13,13,−2,3,2,−2,3,5,3,−4,−1,0},
{1,4,0,14,0,1,0,0,−1,−1,23,−15,−8,−1,1,−1,6,−2,−5,28,6,3,1,−1,−37,21,−9,3,−54,4,−8,1,0,−45,1,−13,
6,33,−2,8,22,1,61,−5,24,−7,−5,−1,4,1,−6,−32,0,−14,1,−2,−4,−2,−3,4,6,−1,4,0},
{−3,2,−6,−85,12,−7,5,−4,4,−3,29,59,20,−7,3,0,−3,−9,−31,17,−43,4,−3,0,−1,13,2,−11,−4,16,−2,
2,2,1,0,0,9,1,−1,0,1,−6,7,3,0,−1,−2,0,1,0,1,−4,−2,−1,0,1,0,0,0,3,0,−1,1,0},
},
{
{70,−48,6,−4,1,−1,1,0,−75,43,2,1,0,0,0,0,33,−5,−12,3,−2,1,−1,0,−9,−9,9,0,0,0,0,0,3,6,−2,−2,
0,0,0,0,−2,−2,0,1,0,0,0,0,2,1,0,0,0,0,0,0,−1,−1,0,0,0,0,0,0,0},
{−81,3,14,2,3,0,1,0,−13,55,−19,1,−3,1,−1,0,53,−46,−4,6,−2,1,−1,0,−18,3,20,−7,2,−1,1,0,7,6,−12,
−1,−1,−1,0,0,−2,−4,3,4,−1,0,0,0,3,1,−1,−2,0,0,0,0,−1,−1,1,0,0,0,0,0},
{48,−19,12,−3,1,−1,0,0,54,3,−29,2,−4,1,−2,0,−6,−62,34,2,3,0,1,0,−34,49,6,−15,4,−3,1,−1,7,−4,−23,
9,−1,1,0,0,−5,−1,11,2,−3,1,0,0,1,0,−3,−3,1,0,0,0,−3,1,2,1,0,0,0,0},
{31,18,−23,7,−3,2,−1,1,50,−5,10,−7,−1,−2,0,−1,33,−20,−36,10,−2,2,−1,−2,−52,50,3,−2,1,0,0,−22,
40,0,−27,7,−4,2,−1,−1,−6,−20,15,3,0,1,0,−3,3,9,2,−6,0,0,0,0,−3,2,−2,0,1,0,0},
{−19,−75,28,1,5,0,2,0,37,42,−1,−14,0,−3,0,−1,−54,12,−29,18,−1,3,−1,1,35,−9,18,1,−7,2,−2,1,−10,
−5,−2,−11,6,−1,1,0,2,5,0,6,0,−1,0,0,−2,−1,−2,−1,−2,0,0,0,0,1,0,2,1,0,1,0,0},
{17,4,16,−11,1,−2,1,−1,43,33,−28,12,−4,2,−2,1,42,7,−2,−15,−3,−2,−1,−1,11,−30,−45,
20,1,3,0,1,4,−38,54,7,−7,2,−11,23,−6,−25,7,−3,1,−1,0,−10,−6,14,2,0,1,0,−2,3,6,−4,−3,0,0,0},
{−17,−29,9,−13,4,−2,2,−1,−18,−30,−3,20,−3,3,−1,1,−14,−20,25,−17,5,−1,2,0,−21,10,12,23,−2,
1,−1,0,4,17,34,−47,−4,−2,0,−1,−19,29,−57,7,26,−5,5,−1,10,−8,9,31,−18,−1,−1,0,−1,2,0,−14,−5,5,−1,1},
{−19,−64,−9,1,0,1,0,0,30,−30,47,−4,4,−1,2,0,42,27,−13,−20,1,−4,0,−1,−52,4,−20,
12,4,1,1,0,16,10,−3,14,−9,2,−2,1,2,−17,12,−6,−3,2,−1,1,−1,9,2,−8,5,−1,0,0,−3,0,−5,3,2,−1,0,0},
{−10,−33,22,2,−2,−1,−1,0,−6,−41,−21,−1,4,2,1,1,29,2,44,13,−7,1,−2,0,25,−28,−1,−44,9,−4,3,−1,−48,
26,0,30,12,−3,3,−1,10,20,−8,−10,−24,2,−4,1,−4,−13,−8,5,12,6,0,2,7,2,15,−3,−2,−4,−1,−1},
{5,5,6,−8,2,−1,1,0,15,20,0,0,2,−1,0,0,28,41,6,−13,3,−2,1,−1,15,24,−32,−15,1,−5,0,−2,−21,−7,−55,
−7,11,0,3,0,−9,−5,−29,57,14,1,3,0,13,−8,25,28,−26,−2,−3,0,3,−10,7,−13,−10,6,−1,1},
{−3,−24,−13,3,1,1,0,0,−4,−45,2,9,−4,0,−1,0,38,−24,7,10,2,2,1,1,63,4,18,6,−13,−1,−4,0,14,−57,
−7,−27,−1,2,0,1,−15,−10,28,13,18,−2,4,−1,−1,17,6,−11,−10,−5,0,−2,−6,1,−1,15,3,4,1,0},
{5,15,74,−17,7,−6,3,−2,−2,−34,−44,−13,6,−2,1,−1,11,37,−21,39,−7,3,−1,1,−33,−7,16,−4,−16,5,−4,
1,30,−4,−2,−14,9,1,0,1,−4,−15,6,5,6,−5,2,−1,−1,9,3,−3,−4,0,1,−1,−3,1,−7,2,1,1,0,0},
{−9,−13,−18,−4,0,−1,0,0,−18,−25,−33,−6,1,−1,0,0,−28,−38,−36,−2,4,0,0,0,−35,−44,−30,
13,9,3,2,1,−28,−31,−6,30,10,4,3,1,−8,−7,19,35,4,1,1,0,2,0,26,16,−11,−3,−2,−1,0,−2,13,−5,−9,1,−1,0},
{0,0,−3,6,−10,3,−2,1,−1,−2,1,−11,14,−4,2,−2,−1,−1,−6,11,−14,4,−2,4,2,8,−11,17,−3,2,−1,−1,3,−14,
8,−27,1,−4,1,1,−18,8,−40,46,2,7,0,−15,30,−31,65,−2,−22,4,−5,10,−16,18,−9,−44,17,−3,2},
{0,4,−18,25,2,1,−1,0,−2,−7,25,−35,−4,0,1,0,9,1,−22,27,11,−3,1,−1,−18,17,10,−21,−23,5,−3,
1,16,−33,3,1,34,−1,3,0,−30,51,−7,0,−20,−9,0,−2,11,−19,−30,18,3,12,−2,2,6,−9,40,−9,−7,−3,−2,1},
{−7,−18,−74,0,−9,−1,−3,0,5,18,−49,28,−2,6,−1,2,−4,46,32,32,−9,3,−2,1,−30,−9,17,−17,−15,2,−3,
0,7,−11,4,−16,6,2,0,1,6,−7,5,−2,6,−4,2,−1,−7,0,3,−1,−2,−1,2,−1,−3,4,−1,−1,0,1,0,0},
}
{ //2
{
{117,−39,−4,−5,−1,−2,0,−1,23,−4,−2,0,−1,0,0,0,−21,6,1,1,0,0,0,0,−11,3,1,0,0,0,0,0,−5,
2,0,0,0,0,0,0,−3,1,0,0,0,0,0,0,−2,1,0,0,0,0,0,0,−1,0,0,0,0,0,0,0},
{22,−3,−2,−1,−1,0,0,0,−116,29,5,3,1,1,1,0,−27,−1,3,0,1,0,0,0,24,−6,−1,0,0,0,0,0,12,−1,−1,
0,0,0,0,0,0,5,−1,0,0,0,0,0,0,2,0,0,0,0,0,0,1,0,0,0,0,0,0,0},
{−21,17,−4,2,−1,1,0,0,23,4,−3,0,−1,0,0,0,−118,19,7,2,2,1,1,0,−18,−4,3,0,1,0,0,0,19,−5,−1,
0,0,0,0,0,0,7,−1,−1,0,0,0,0,0,2,0,0,0,0,0,0,2,−1,0,0,0,0,0,0},
{−34,−101,54,−11,9,−3,4,−1,−7,−23,10,−1,1,0,0,0,−9,28,−11,3,−2,1,−1,0,6,8,−3,0,−1,0,0,0,8,1,−2,
0,0,0,0,0,0,2,1,−1,0,0,0,0,0,1,2,−1,0,0,0,0,0,1,1,0,0,0,0,0,0},
{6,2,−3,0,0,0,0,0,28,−13,1,−1,0,−1,0,0,−12,−14,3,−1,1,0,0,0,117,−16,−8,−1,−2,0,−1,0,28,6,−4,
0,−1,0,0,0,−12,3,1,0,1,0,0,0,−5,0,1,0,0,0,0,0,−1,0,0,0,0,0,0,0},
{6,16,1,−1,0,0,0,0,−23,−102,36,−8,6,−2,2,−1,−14,−49,10,0,1,0,1,0,−12,24,−9,3,−1,1,0,0,3,17,−4,
1,−1,0,0,0,0,4,5,−2,0,0,0,0,0,0,1,0,0,0,0,0,0,0,2,0,0,0,0,0,0},
{8,0,0,−1,0,0,0,0,6,2,−1,0,0,0,0,0,24,−7,1,−1,0,0,0,0,−25,−11,3,−1,1,0,0,0,116,−14,−8,−1,−2,

TABLE 8-continued

```
0,-1,0,33,2,-4,0,-1,0,0,0,7,2,0,0,0,0,0,0,-1,0,0,0,0,0,0,0},
    {-9,-30,18,-5,2,-1,1,-1,12,44,0,0,-1,0,0,0,-14,-99,24,-4,3,-1,1,0,-14,-31,-3,2,0,0,0,0,-8,
31,-7,2,0,0,0,0,2,5,0,0,0,0,0,0,1,-2,0,-1,0,0,0,0,0,1,-1,0,0,0,0,0},
    {-19,-51,-93,27,-6,5,-4,2,-8,-21,-50,15,-1,2,-2,1,-2,-8,12,-4,4,-1,1,-1,-1,3,16,-4,1,-1,
1,0,3,8,9,-2,0,0,0,0,0,3,4,-1,-1,0,0,0,0,0,2,2,0,0,0,0,0,0,1,0,0,0,0,0,0},
    {2,-1,-1,0,0,0,0,0,0,6,-3,-1,0,0,0,0,0,0,-2,0,0,0,0,0,0,20,-3,1,0,0,0,0,0,-33,-13,
3,0,1,0,0,0,117,-10,-9,0,-2,0,-1,0,24,6,-3,0,-1,0,0,0,-5,0,1,0,0,0,0,0},
    {0,5,1,0,0,0,0,0,5,29,-10,2,-1,0,-1,0,-2,2,-10,1,-1,0,-1,0,8,94,-19,1,-2,0,-1,
0,16,72,1,0,0,0,0,0,14,-7,7,1,1,1,0,0,2,-16,2,-1,0,0,0,0,-1,-2,0,0,0,0,0,0},
    {7,19,48,-1,2,-1,2,0,-9,-25,-87,24,-6,4,-4,2,-6,-22,-51,7,0,0,-1,0,0,-5,29,-15,4,-2,1,-1,
1,2,18,-6,1,0,0,0,2,7,2,-1,0,0,0,0,1,0,1,0,0,0,0,0,0,0,0,0,0,0,0,0,0},
    {-2,0,1,0,0,0,0,0,-2,1,1,0,0,0,0,0,-2,-1,0,0,0,0,0,0,-2,2,1,1,0,0,0,0,0,-3,1,0,0,0,0,0,16,0,-1,
0,-1,0,0,0,-96,6,6,0,2,0,1,0,-82,0,6,-1,2,0,1,0},
    {2,9,-1,1,1,0,0,0,-4,-17,1,0,-1,0,0,0,7,41,-1,1,0,0,0,0,-9,-69,3,-3,1,-1,0,0,0,91,-13,6,-1,
2,0,0,13,9,7,1,0,1,0,0,-1,-25,3,-4,0,0,0,0,-4,3,-2,-1,0,0,0,0},
    {-3,-7,-27,5,2,0,-1,0,4,9,42,7,0,1,2,0,-7,-14,-80,17,-10,4,-3,1,-5,-18,-39,-23,1,-3,-1,-1,
4,2,59,-16,3,-2,1,0,2,4,17,5,1,0,0,0,0,2,-3,3,0,0,0,0,0,0,-2,1,0,0,0,0},
    {3,-2,24,69,-55,22,-7,4,2,1,15,26,-21,7,-1,1,0,2,-3,-56,39,-15,5,-3,-1,1,-13,-26,15,-5,0,-1,
-1,-1,-6,1,-6,1,-1,0,0,0,-1,1,-2,1,-1,0,0,-1,0,3,0,0,0,0,0,0,0,1,1,0,0,0},
    },
    {
    {-72,45,-8,5,-1,2,-1,1,77,-39,2,-3,0,-1,0,0,-37,9,5,-1,1,0,0,0,11,2,-4,1,-1,0,0,0,-4,-2,
1,0,0,0,0,0,2,1,0,0,0,0,0,0,-2,0,0,0,0,0,0,0,1,0,0,0,0,0,0,0},
    {-87,11,10,0,2,0,1,0,-28,33,-11,3,-2,1,-1,0,67,-31,0,0,-1,0,0,0,-31,5,6,-1,1,0,1,0,9,4,-3,
0,0,0,0,0,-2,-2,0,0,0,0,0,0,3,-1,0,0,0,0,0,0,-1,0,1,0,0,0,0,0,0},
    {19,-50,33,-8,5,-2,2,-1,77,29,-31,2,-4,0,-2,0,-2,-40,10,2,1,0,0,0,-40,26,5,6,-1,1,0,1,0,9,4,-3,
-6,2,-1,0,0,0,-9,0,3,0,0,0,0,0,3,0,-1,0,0,0,0,0,-3,0,1,0,0,0,0,0,0},
    {-45,-54,39,-8,6,-2,2,-1,-17,44,-21,1,-1,0,-1,0,-50,19,-6,8,-2,2,-1,1,57,-19,2,-2,-1,0,0,0,-20,
0,3,-1,1,0,0,0,7,2,0,0,0,0,0,0,-3,0,-1,0,0,0,0,0,2,0,0,0,0,0,0,0,0},
    {-5,30,-8,1,-1,0,0,0,-45,14,-13,8,-3,2,-1,1,-65,-39,33,-7,5,-1,2,0,-4,52,-17,-2,0,-1,0,0,37,-30,
-5,5,-2,1,-1,0,-20,6,8,-2,1,0,0,0,8,-2,1,0,0,0,0,8,-1,-2,0,0,0,0,0,-3,1,0,0,0,0,0,0},
    {-23,-40,10,-1,2,0,1,0,-16,-29,25,-5,8,4,-2,2,-1,-22,57,-25,5,-2,0,-1,0,-56,-7,4,4,-1,
2,0,1,61,-9,0,-3,0,-1,0,0,-27,0,3,0,1,0,1,0,11,4,-1,0,-1,0,0,0,-5,-1,-1,0,0,0,0,0},
    {-5,-8,-52,29,-8,6,-3,2,10,46,52,-28,5,-5,2,-1,-28,-36,-48,15,1,1,-1,1,-1,2,39,1,-3,
1,0,0,2,17,-15,-9,3,-2,0,-1,0,-8,1,7,-2,1,0,0,1,2,0,-4,1,0,0,0,0,-3,0,2,0,0,0,0,0},
    {-2,10,13,-7,1,-1,1,0,-23,-9,-16,7,-1,1,-1,0,-47,-8,10,-3,0,0,0,0,-70,-17,13,0,4,-1,1,0,-36,
52,-4,1,-1,0,0,0,0,51,-15,-10,1,-2,1,-1,0,-22,-4,5,0,1,0,0,0,3,1,0,0,0,0,0,0},
    {-23,-69,-31,9,-2,2,-2,0,-6,-35,41,-4,0,0,1,0,8,-13,30,-17,7,-3,2,-1,-2,44,-35,4,0,-1,0,0,-34,
-12,2,8,-2,2,0,1,30,6,1,-2,0,0,0,0,-12,-4,1,0,0,0,3,3,-1,0,0,0,0,0,0},
    {1,5,-53,8,-3,2,-3,1,19,69,-2,17,-6,4,-1,1,-3,46,37,-20,2,-2,1,-1,-28,-35,-39,1,2,-1,0,0,0,-15,
12,8,-2,2,0,0,0,5,4,4,-4,1,-1,0,0,-5,0,1,1,0,0,0,0,-1,1,-2,0,0,0,0,0,0},
    {6,23,19,-1,1,0,1,0,1,19,-2,-12,5,-2,1,-1,1,25,-46,24,-6,2,-2,1,-27,38,4,-3,-7,3,-2,1,-35,-75,
20,-3,5,-1,1,0,37,19,3,-2,1,-1,1,0,-20,-1,-1,0,-1,0,0,0,1,4,-2,0,0,0,0,0,0},
    {-3,-2,0,0,-1,0,0,0,-6,-5,0,-1,0,0,0,0,-10,-5,-1,-1,0,0,0,0,-28,-7,1,0,0,0,0,0,-80,-7,2,-1,
1,0,0,0,-90,8,8,1,1,0,1,0,23,11,-3,-1,-1,0,0,0,2,-3,-1,1,0,0,0,0},
    {0,-3,-8,9,-4,1,-2,0,-2,-5,-8,-8,5,0,2,0,6,19,26,33,-13,5,-2,1,-1,1,20,-70,12,-6,3,-2,-5,-8,-60,
43,13,-2,2,0,5,1,35,5,-23,5,-2,1,0,-1,-8,-15,13,0,0,0,-1,1,0,7,-2,-2,1,0},
    {-3,0,-19,-62,50,-15,4,-4,3,1,25,61,-45,10,-1,2,-2,-1,-1,-26,-20,10,5,-4,1,4,7,24,-12,14,-12,
5,-2,-4,-7,-15,10,-11,5,-1,0,2,2,5,0,2,1,-1,0,1,0,-1,-1,0,-1,0,0,0,1,1,0,0,0},
    {0,-2,-3,0,1,0,0,0,-1,-2,4,-2,0,1,0,0,-4,-8,4,8,-2,1,-1,0,-4,-14,9,-14,5,-1,1,0,1,8,14,6,5,-1,
1,-1,2,83,-36,-1,-9,0,-2,0,28,-74,0,5,1,2,-1,1,-17,16,14,-2,1,-,1,0},
    {7,26,72,0,1,2,4,0,7,25,83,-5,3,1,4,0,-2,-4,10,-18,6,-4,0,-1,-2,-8,-37,-5,3,-3,0,-1,-2,8,-21,
15,-1,2,0,0,0,2,6,2,-3,1,-1,0,3,-5,-2,-3,2,0,0,0,0,0,-1,1,0,0,0,0},
    }
    },
    { //3
    {
    {-112,43,9,3,2,1,1,0,12,-31,10,0,2,0,1,0,23,-12,-8,3,-1,1,0,0,4,3,-4,-1,0,0,0,0,4,0,-1,-1,
0,0,0,0,1,1,-1,0,0,0,0,0,2,0,0,0,0,0,0,0,0,0,0,0,0,0,0,0},
    {-21,-43,19,1,3,0,1,0,91,-3,-38,2,-5,1,-2,0,-28,51,2,-9,0,-2,0,-1,-7,-9,15,1,0,0,0,0,-3,2,-2,
2,0,0,0,0,-1,-2,2,0,0,0,0,0,-1,1,0,0,0,0,0,0,-1,-1,1,0,0,0,0,0,0},
    {23,-31,17,-6,4,-2,1,-1,-3,-78,10,16,0,4,0,2,34,13,-64,7,-1,1,-1,0,-13,42,1,-23,2,-3,0,-1,
2,-1,12,0,-4,0,-1,0,-3,6,0,1,1,-1,0,0,0,0,1,0,0,1,0,0,-1,2,0,0,0,0,0,0,0},
    {-40,-93,33,8,5,2,2,1,-53,18,-22,5,2,1,0,0,13,-17,9,-4,1,0,0,0,16,-5,-16,6,-1,1,0,0,1,10,-6,
-6,2,-1,0,0,3,0,0,-2,-2,1,0,0,1,2,0,-1,0,0,0,0,0,1,0,0,0,0,0,0,0},
    {-10,19,-3,-2,-1,0,0,0,-52,2,-38,9,1,2,0,1,0,13,56,-7,-45,4,-7,1,-3,1,-11,68,-10,-12,1,-3,0,9,-17,
1,27,-8,2,-1,1,-3,1,-2,5,3,-2,1,-1,2,-3,-1,2,1,0,0,0,-1,0,1,0,1,0,1,0},
    {12,20,61,-17,3,-4,1,-2,-21,-52,9,26,-1,4,0,2,-56,1,4,0,4,1,1,0,16,-47,-3,20,-2,2,0,1,-1,9,-37,
-3,8,0,1,0,3,0,4,-12,-3,1,0,0,1,3,-5,2,-1,-1,0,0,0,1,0,1,-2,0,0,0,0},
    {-17,-3,-6,0,4,0,1,0,-8,23,7,13,-4,3,-2,1,-75,-19,-44,6,20,-1,5,0,27,8,3,-6,1,-2,1,-1,0,4,-2,
33,12,-27,-1,-3,0,4,1,-7,13,7,-5,0,-1,-1,-1,4,-2,1,2,1,0,2,-1,-2,1,0,-1,1,0},
    {6,-24,18,-17,2,-3,2,-1,2,24,-11,56,-21,-6,-2,0,-1,18,-32,28,-6,-8,0,-1,1,26,-13,44,2,-25,3,-5,
1,4,-15,4,56,-20,-1,-2,1,-6,8,-25,21,13,-5,1,-1,-2,-1,-3,1,4,1,1,0,-1,1,-5,3,-2,2,0},
    {10,29,86,-25,1,-4,2,-2,13,62,-2,27,-9,2,-2,1,37,-4,-19,9,9,-1,1,9,-16,12,0,-10,3,1,1,0,-4,-5,
10,-1,-2,-1,0,0,-1,-4,1,4,0,0,0,0,-1,-1,0,0,0,0,0,0,-1,-1,0,1,0,0,0,0,0},
    {20,18,1,12,-5,4,-2,1,25,-17,-63,16,14,-1,2,0,20,-57,0,-48,10,0,1,-1,49,10,-7,-3,-23,5,-5,
1,-12,26,2,5,-3,-3,1,-1,4,-1,4,1,1,0,0,0,-3,3,0,-1,0,0,1,0,1,-1,0,0,0,0},
    {9,12,22,13,-4,-2,1,0,-9,-25,-25,-27,6,2,0,0,12,15,35,14,-11,-4,-1,-1,-12,-32,-29,-26,
17,10,3,3,21,15,36,-13,-53,-6,-6,-1,-5,0,-2,50,16,-11,-3,-3,1,1,-4,-13,5,9,2,0,-1,-2,1,9,-1,-5,1,0},
    {3,-11,-31,5,9,-1,0,0,15,9,10,25,-8,5,-1,0,38,-10,-24,7,41,-3,7,-1,-14,-71,0,-24,
```

TABLE 8-continued

```
2,20,0,6,6,9,-45,-2,-26,-2,-1,0,-3,10,9,-14,-1,-5,-1,-3,6,1,-2,4,-2,1,1,-1,-2,3,2,-4,1,0,1,0},
       {-1,4,-3,14,1,-3,0,-1,-4,4,-11,9,3,2,-3,1,-1,7,-7,22,3,-7,0,-3,-5,8,-11,12,7,1,-1,0,-7,20,-15,
43,13,-23,4,-6,-3,-6,-15,-19,85,-5,-5,0,2,-12,3,-41,4,39,-8,5,-2,0,-5,-4,-9,11,3,-2},
       {-2,-4,6,19,-5,5,-1,2,1,-12,-24,11,16,-3,4,-1,-22,-51,6,-16,6,7,-1,2,-82,-2,5,1,-6,3,2,0,10,-56,
-2,5,1,-1,1,1,-1,5,-33,0,-1,0,-1,0,1,0,0,-12,1,-2,1,-1,0,1,-2,-1,-3,0,0,0},
       {5,2,1,23,1,1,0,-1,4,-4,-11,17,16,3,-3,0,9,-4,5,29,8,-8,4,-7,33,-1,21,2,71,-1,-1,0,1,-14,-2,
3,8,63,-2,10,-10,2,-39,0,-12,10,23,-1,-2,-21,2,-7,7,2,0,-1,-6,-5,-4,2,-1,2,},
       {4,2,18,86,-4,5,-4,4,4,6,47,33,38,-9,6,-1,1,29,16,-22,24,16,-1,3,11,14,-9,1,-19,14,3,2,5,-2,
5,-5,-3,-9,5,-1,-2,1,3,2,-3,-1,-2,1,-1,-1,1,3,-1,0,0,0,0,0,0,2,0,-1,1,0},
       },
       {
       {102,-43,-2,-4,-1,-1,0,-1,-35,10,-12,1,-3,0,-1,0,-33,32,-1,0,0,0,0,0,-17,2,8,-1,1,0,0,0,-6,-1,
3,1,0,0,0,0,0,-3,-1,1,1,0,0,0,0,-2,0,0,0,0,0,0,0,-1,0,1,0,0,0,0,0},
       {-51,4,9,0,2,0,1,0,100,-31,-11,-1,-3,0,-1,0,-5,40,-9,0,-2,0,-1,0,-26,5,12,-1,2,0,1,0,0,-6,
2,2,0,0,0,0,-3,0,0,0,0,0,0,0,-1,0,0,0,0,0,0,-2,0,1,0,0,0,0,0,0},
       {-26,5,3,2,0,1,0,0,7,41,-11,0,-2,0,-1,0,-88,2,33,-2,6,-1,2,0,30,-58,2,6,0,2,0,1,12,5,-18,2,-1,
0,-1,0,3,2,-1,-3,1,-1,0,0,1,1,-1,-1,0,0,0,0,2,-1,0,0,0,0,0,0,0},
       {-13,-72,21,-1,4,0,2,0,27,-14,-7,0,-1,0,-1,0,0,0,7,-40,0,6,0,2,0,1,49,9,-47,3,-5,1,-2,0,-15,50,-1,
-14,0,-3,0,-1,-2,-1,14,-1,-1,0,0,0,-3,5,0,0,0,0,0,0,0,0,3,0,-1,0,0,0},
       {34,81,-28,2,-6,1,-2,0,42,-11,21,-7,3,-2,1,-1,-22,-47,5,9,0,2,0,1,15,18,-30,-1,-2,0,-1,0,-13,
21,13,-10,0,-2,0,-1,-1,-7,10,5,-1,0,0,0,-3,-1,-1,2,1,0,0,0,0,-1,0,0,0,0,0,0,0},
       {23,9,8,-5,1,-1,1,-1,-4,-74,18,4,3,1,1,1,7,-6,-4,2,-1,1,0,0,-1,-50,-3,14,-1,4,0,1,28,8,-61,3,-2,
1,-1,0,-10,39,-2,-24,2,-4,1,-1,4,1,13,-4,-4,0,-1,0,-2,4,2,1,-1,0,0,0},
       {-9,-6,13,-2,3,-1,1,0,-35,-63,13,8,1,2,0,1,-72,13,-45,6,-1,2,-1,1,19,34,4,-23,3,-5,1,-2,2,-11,
29,1,-1,1,0,0,7,-9,-4,8,-2,1,0,0,0,1,-4,1,1,0,0,0,2,1,-2,-1,1,0,0,0},
       {4,32,6,-3,-2,0,-1,0,-24,-11,-39,6,-2,2,-1,1,11,65,2,-14,-2,-3,0,-1,12,-10,-9,4,1,0,0,0,-1,
60,5,-27,-1,-5,0,-2,-12,-17,52,7,-2,0,0,0,4,-11,-10,11,1,1,0,1,-3,0,6,-1,1,-1,0,0},
       {11,14,-6,-3,0,-1,0,0,14,0,-5,2,-3,1,-1,0,22,19,-9,-17,1,-4,0,-1,92,7,51,-1,-8,0,-2,0,-29,-3,-8,
41,3,5,1,2,-8,1,-21,-12,9,-1,2,0,-3,0,5,-5,-3,0,-1,0,1,1,-1,0,0,0,0,0},
       {13,-1,32,-4,1,-2,1,-1,4,-35,10,1,3,-1,1,0,17,-14,38,-3,0,-1,0,0,5,-43,13,14,1,1,0,1,3,-16,
30,9,-4,2,-1,1,1,-45,-11,52,-2,7,-1,3,-3,-6,-56,9,12,0,3,0,-3,7,-8,-9,5,-1,1,0},
       {7,1,-5,-1,-2,0,-1,0,13,15,-3,-6,-1,-1,0,-1,16,5,-12,3,-3,0,-1,0,32,2,-2,-22,4,-6,1,-2,94,-1,
-7,-12,0,-4,0,-7,44,-1,-35,-6,3,-1,-1,-16,9,4,5,12,-1,3,0,-4,-6,0,1,3,1,0,0},
       {13,31,99,-18,11,-5,5,-2,9,33,-9,27,-6,6,-2,2,4,-21,-44,5,4,1,1,0,-6,-8,1,-16,2,-1,0,0,-5,-2,
-6,-1,-2,1,0,0,-2,3,1,-7,-1,-1,0,-1,0,1,4,1,-2,0,-1,0,0,0,0,0,0,0,0,0},
       {-2,-10,-5,-1,2,-2,0,-1,6,4,20,-1,-4,0,-1,0,-1,-12,-5,0,2,-2,1,-1,4,0,25,-3,-6,-1,-2,0,-1,-12,-11,
2,2,-3,1,-1,24,7,51,-9,-17,0,-5,0,-1,-12,0,87,-3,2,0,1,-13,6,-45,0,32,-2,5,0},
       {7,14,22,0,-2,1,0,0,-5,-21,-45,-2,1,-1,0,-1,4,13,41,-7,-2,0,0,0,18,13,-29,12,2,1,1,1,-24,-47,
2,-28,-2,-3,0,-1,50,31,-9,5,-12,-1,-3,0,-22,25,26,9,5,-1,1,0,4,-21,-4,1,1,1},
       {-1,-2,-9,-3,0,-1,1,-1,4,17,63,-3,2,0,1,0,17,49,-22,44,-1,6,0,2,24,-40,-38,-18,18,-1,4,0,-31,
-22,2,-28,-28,-10,2,-2,1,2,-3,-4,5,-9,-4,-1,-1,-2,7,0,0,2,-1,-1,0,2,-2,0,1,-1,1,0,0},
       {2,-3,-44,22,-4,5,-2,2,5,-9,-64,26,-2,5,-2,2,10,-31,-48,-5,13,-2,3,-1,1,-48,-1,-36,14,-3,2,-1,
-13,-23,6,-19,-4,3,-2,1,-1,-12,-2,-2,-9,3,-2,0,2,2,-9,3,-6,1,-1,0,1,5,-2,-1,-1,-1,0,-1},
       }
    }
}
```

TABLE 9

```
const int g_aiNsst4×4[4][2][16][16] = {
  { //0
    {
       {108,-44,-16,2,-43,19,6,-1,-11,6,2,-1,0,-1,0,0},
       {37,100,-55,-13,2,-26,14,2,-14,-22,13,4,1,2,-2,0},
       {28,-21,-8,6,102,-17,-31,1,-53,19,14,-3,-81,1,4,0},
       {-33,-38,-94,53,-5,-15,29,-8,7,19,19,-14,3,1,-4,1},
       {8,-11,27,-7,-15,-105,35,25,-5,37,-26,-5,4,17,-6,-6},
       {-25,1,14,-2,-36,12,15,-2,-98,3,29,1,55,-9,-20,2},
       {7,7,14,2,37,33,98,-37,-6,12,-42,10,-9,-15,-14,9},
       {0,33,-7,-2,-12,21,-26,1,3,100,-23,-27,8,-45,22,10},
       {16,28,39,108,-5,-8,-15,-22,-5,-17,-16,-27,4,5,3,4},
       {-10,-10,-34,0,-8,1,-25,6,-33,-26,-98,32,14,5,37,-16},
       {-16,3,5,4,-26,5,13,11,-47,1,13,-7,-104,3,42,-4},
       {3,5,1,17,16,33,26,109,3,-9,-9,-34,10,-2,-9,-26},
       {-3,14,-5,-3,-3,30,-10,-11,-6,40,-11,-5,-7,108,-32,-22},
       {4,9,11,33,1,5,8,15,11,31,99,7,-6,20,-50},
       {3,-2,8,-11,10,4,28,-15,9,-4,23,-34,42,33,101,-16},
       {0,-2,-1,-13,-1,-7,-4,-35,-1,-8,-3,-38,-8,-31,-21,-109},
    },
    {
       {-118,32,21,3,27,4,-5,-2,16,-3,-6,0,4,-2,0,0},
       {-30,-97,33,16,-51,3,25,3,21,30,-6,-8,6,3,-5,-2},
       {0,65,20,-16,-99,3,35,1,10,-15,-5,4,14,-1,-8,0},
       {24,4,63,-10,21,90,-5,-27,14,-8,-40,-1,-10,-18,0,8},
       {18,5,91,-2,25,-74,10,17,-21,-12,-20,4,-1,13,-3,-4,},
       {8,-3,-1,-7,-24,-27,-90,8,69,-9,-38,10,-2,1,20,3},
       {19,30,-9,5,29,-15,43,5,69,75,-19,-29,-1,-5,-22,-6},
```

TABLE 9-continued

```
        {-3,21,22,-3,-20,9,-57,-9,-55,86,15,-22,15,10,7,-4},
        {-7,-17,-1,-112,7,-16,9,-41,8,15,17,26,-2,-3,-1,9},
        {10,5,37,0,7,22,-11,36,44,-4,101,10,-8,15,10,-19},
        {2,6,11,34,-10,-29,1,-85,12,-7,35,-30,-46,-27,27,32},
        {8,-2,2,17,11,0,-4,-56,17,-21,9,-15,86,63,-20,-5},
        {-4,4,-8,-8,-4,12,16,-2,-2,-1,-22,-22,54,90,53,-30},
        {-4,-7,-1,-24,-7,-2,-24,1,-4,-29,5,-75,-34,-2,-78,-37},
        {1,-6,0,-30,6,-1,11,25,0,-18,1,-79,46,-36,70,0},
        {1,0,-1,9,0,-7,3,-34,-1,3,-5,26,8,-38,20,-112},
    }
{ //1
    {
        {-110,40,5,3,44,13,-12,-1,8,-15,-6,2,3,-2,4,2},
        {-47,-29,16,-1,-91,42,22,-2,20,40,-15,-5,10,-5,-13,1},
        {36,21,-3,-4,17,74,-32,-6,58,-17,-49,5,1,-39,-2,11},
        {-13,-93,27,2,49,-14,33,-5,51,-12,-1,-10,-1,-17,2,-2},
        {11,28,-3,-2,47,3,38,-10,1,85,-12,-27,17,1,-58,-5},
        {0,-35,34,-4,25,58,-4,-16,-83,2,-30,1,-36,23,2,12},
        {-17,-47,-93,16,9,-5,-42,30,-13,28,-25,18,0,-6,-12,14},
        {-5,4,20,-6,-15,-58,3,-24,-31,-16,-68,3,25,-59,-17,38},
        {6,-16,34,-4,9,-1,-49,-4,3,12,-7,24,95,51,4,2},
        {-3,2,38,-15,-7,-41,-58,-5,37,32,-20,17,-71,31,-21,4},
        {-3,-5,-28,-9,-13,-1,10,-18,9,-64,-30,-38,2,58,-68,-19},
        {5,16,-19,29,2,-10,49,-9,22,10,-53,8,-7,59,62,40},
        {-6,-8,-36,-86,1,1,-9,-75,4,14,14,-16,2,1,33,10},
        {0,4,-3,-55,5,9,41,30,4,-14,13,85,-2,10,-36,39},
        {1,-2,-6,63,-3,9,-9,-70,7,-5,49,20,-4,-1,-32,58},
        {1,0,11,-22,0,4,-15,51,3,-3,23,-70,3,8,-2,86},
    },
    {
        {-88,55,-6,3,66,-28,-8,1,-11,-10,11,-1,3,6,-1,-2},
        {-58,-19,26,-2,-28,75,-30,0,46,-43,-10,11,-7,-2,19,-5},
        {45,-34,29,-5,69,-1,-34,2,-7,-58,32,3,-26,32,7,-11},
        {-34,-72,43,-1,32,16,15,-18,-55,43,-31,7,19,-4,-5,9},
        {19,-3,-36,21,50,6,36,-22,30,-19,-63,16,-7,-42,51,6},
        {30,49,11,-9,2,32,-59,5,-52,1,-14,30,52,-32,27,-9},
        {9,18,77,-44,8,-42,-18,5,54,33,-24,11,-20,-29,2,1},
        {-21,-37,6,5,-32,-63,7,-1,-3,-26,34,23,37,-20,61,-40},
        {5,-26,-16,4,36,13,-11,24,48,12,38,-36,67,-51,-32,5},
        {14,27,43,43,-1,2,29,-73,24,-16,7,22,49,29,-31,-6},
        {0,12,27,-49,-13,-6,46,11,-26,-66,-12,-40,27,-13,0,55},
        {9,24,18,-31,19,46,59,17,5,32,28,-25,8,26,46,-54},
        {1,14,33,50,-7,12,3,-29,-25,5,46,-41,-50,-65,18,12},
        {-3,-2,-22,-59,4,16,28,-32,-11,-12,34,61,-24,-47,-43,-22},
        {-1,-4,-20,-31,5,6,-16,-44,17,33,44,14,7,25,50,77},
        {3,7,23,41,5,10,36,73,2,3,25,69,-3,-2,1,43},
    }
},
{ //2
    {
        {-112,48,-1,3,-28,11,1,0,19,-8,0,0,10,-4,0,0},
        {-24,8,-2,1,112,-42,-3,0,31,-11,-3,1,-16,6,0,0},
        {37,87,-73,14,10,26,-20,3,-11,-17,14,-3,-6,-8,6,-1},
        {28,-6,-3,1,-19,9,-3,1,109,-38,-5,0,39,-13,-3,1},
        {9,18,-14,5,-32,-89,65,-9,-10,-38,27,-4,4,10,-8,2},
        {-22,-58,-66,78,-8,-16,-21,23,5,16,13,-17,4,6,6,-8},
        {2,-2,0,0,-26,6,1,1,36,-8,0,-1,-116,28,8,-1},
        {11,30,-16,-1,-10,-24,15,-3,28,89,-51,4,13,46,-25,-1},
        {2,8,8,-12,-21,-51,-68,61,-14,-30,-46,40,0,3,1,-3},
        {16,33,63,90,7,15,26,30,-5,-11,-25,-10,-4,-6,-13,-5},
        {-1,-1,-16,3,-4,-19,24,-10,6,28,-40,17,-23,-103,35,5},
        {-10,-24,-35,9,8,28,28,-30,-17,-44,-58,46,-4,11,-55,30},
        {-2,-6,-13,-17,12,26,53,83,8,18,37,60,1,0,-1,1},
        {1,4,7,-5,-13,-26,16,6,20,36,-24,-16,-43,-91,49},
        {4,10,21,37,-5,-12,-27,-46,8,19,41,77,5,10,24,51},
        {-1,-2,-4,-9,2,5,13,29,-3,-7,-21,-43,7,19,47,102},
    },
    {
        {-98,41,-1,3,66,-21,-4,0,-14,-2,5,-1,1,3,-1,0},
        {59,36,-29,4,36,-61,21,-1,-61,32,3,-4,-22,-3,-8,3},
        {-8,75,-46,6,-56,-33,24,2,58,-5,-2,-5,-18,3,-1,2},
        {47,4,4,-4,73,-11,-15,4,51,-38,12,-2,-61,22,3,-1,2},
        {-14,-50,-14,20,20,-21,56,-26,31,55,-52,8,-31,-23,14,5},
        {1,14,74,-51,-14,-49,-34,30,20,50,-9,-3,-12,-18,8,-1},
        {18,16,-3,2,38,21,-10,0,61,3,-15,5,89,-43,10,-2},
        {14,53,-7,2,6,61,-24,-3,-31,19,-36,18,-46,-47,41,-7},
        {-8,-22,-51,-18,9,22,-10,52,7,37,48,-54,-19,-41,-23,19},
        {-3,-4,-22,-81,8,13,47,51,-11,-29,-47,0,11,24,19,-8},
        {-8,-30,-16,5,-13,-53,-12,8,-13,-59,14,4,-4,-67,58,-18},
        {5,21,50,-18,2,13,65,-26,-8,-36,16,-18,-11,-58,-42,30},
```

TABLE 9-continued

```
            {4,7,25,49,-2,-3,-1,25,-7,-16,-42,-85,7,18,34,44},
            {2,11,24,0,4,20,50,-7,6,27,65,-20,7,22,72,-39},
            {2,5,24,59,2,3,26,77,-2,-4,-9,20,-5,-12,-35,-61},
            {0,1,7,19,1,2,16,45,2,4,27,68,2,7,27,86},
        }
    },
    { //3
        {
            {114,-38,-3,-2,20,23,-12,1,-22,18,4,-2,-5,-1,5,0},
            {19,43,-17,2,-84,59,14,-6,-18,-34,33,-1,11,-20,-1,7},
            {-34,29,-21,2,45,55,-33,-7,-44,58,27,-17,-8,-21,32,0},
            {31,79,-42,3,56,-5,31,-17,42,-19,7,9,-10,20,-9,6},
            {13,29,-31,6,-49,-5,-39,12,25,49,-61,-15,-12,41,21,-33},
            {11,43,20,-7,-7,-45,46,9,-85,18,-31,24,-22,-10,2,-8},
            {-10,-18,-78,37,12,-12,-37,9,-48,-46,-21,4,7,-3,-43,-10},
            {18,16,-15,7,-8,-71,-21,-2,6,-6,27,-45,40,-55,51,-1},
            {8,35,43,-12,26,30,-27,42,4,-21,-46,14,71,-26,-14,-21},
            {8,28,40,17,1,-10,-56,51,5,-31,20,-13,-77,-6,-8,18},
            {-5,-12,6,-24,17,19,16,-12,-11,-57,-7,-39,-27,11,43,-83},
            {-3,-20,-24,44,2,15,29,45,28,1,-12,62,-21,-47,53,-13},
            {1,2,17,74,4,0,33,47,-12,13,38,-31,33,55,-3,-21},
            {-3,-2,-19,-52,0,-12,-22,36,-20,-22,30,46,23,61,52,23},
            {2,6,33,60,5,9,-20,-63,-14,-32,-35,12,7,24,50,40},
            {5,11,20,16,-8,-20,-39,-42,4,13,49,65,4,1,-19,-68},
        },
        {
            {-98,30,5,2,67,-29,-4,-1,-18,14,1,-1,5,-2,0,0},
            {-15,-88,29,3,36,62,-38,-4,-18,-4,24,0,3,-6,-5,2},
            {65,24,-20,0,57,-3,5,-2,-81,16,14,1,26,-14,-6,2},
            {-29,24,-39,13,-17,54,35,-18,-24,-77,19,18,20,13,-29,-4},
            {1,41,73,-34,-26,-6,-50,36,-24,-39,20,-15,25,13,-12,0},
            {-30,-38,0,9,-63,-28,16,-3,-49,27,-19,-1,68,-29,-1,-2},
            {11,-32,22,-15,31,-18,31,16,-10,-41,-78,13,12,54,12,-30},
            {12,-29,-25,32,8,-64,-33,-23,19,-19,40,-11,29,56,-37,12},
            {-10,-24,-57,-82,3,-2,14,63,6,6,21,-28,5,8,-14,8},
            {-7,19,-43,18,-8,34,-51,2,-6,8,-23,-42,27,40,72,1},
            {-13,-17,-14,6,-33,-26,-14,1,-70,-10,5,-5,-90,20,9,-5},
            {-3,5,-13,-47,-11,0,-29,-30,0,26,22,86,10,24,19,-50},
            {-3,-2,37,-18,-5,8,60,-24,-9,22,41,-1,5,544,42,59},
            {5,-17,-10,-24,11,-39,-7,-23,8,-67,14,8,5,-57,68,22},
            {-2,6,-10,-48,-3,9,-34,-58,-7,3,-57,2,-6,0,-40,66},
            {-1,0,-12,35,-1,0,-18,68,-1,-2,-11,74,2,4,6,6,6},
        }
    }
};
```

All of the illustrative transform kernel matrices shown in Table 8 are transform kernel matrices multiplied by 128 as a scaling value. In a g_aiNsst8×8[N1][N2][16][64] array present in matrix arrays of Table 8, N1 denotes the number of transform sets (N1 is 4 or 35, distinguished by index 0, 1, . . . , and N1-1), N2 denotes the number (1 or 2) of transform kernel matrices included in each transform set, and [16][64] denotes a 16×64 reduced secondary transform (RST).

As shown in Table 3 and Table 4, when a transform set includes one transform kernel matrix, either a first transform kernel matrix or a second transform kernel matrix may be used for the transform set in Table 8.

While 16 transform coefficients are output when the RST is applied, only m transform coefficients may be output when only an mx64 portion of a 16×64 matrix is applied. For example, when only eight transform coefficients are output by setting m=8 and multiplying only an 8×64 matrix from the top, it is possible to reduce computational amount by half. To reduce computational amount in a worst case, an 8×64 matrix may be applied to an 8×8 transform unit (TU).

All of the illustrative transform kernel matrices shown in Table 9 applicable to a 4×4 region are transform kernel matrices multiplied by 128 as a scaling value. In a g_aiNsst4×4[N1][N2][16] [64] array present in matrix arrays of Table 9, N1 denotes the number of transform sets (N1 is 4 or 35, distinguished by index 0, 1, . . . , and N1-1), N2 denotes the number (1 or 2) of transform kernel matrices included in each transform set, and [16] [16] denotes a 16×16 transform.

As shown in Table 3 and Table 4, when a transform set includes one transform kernel matrix, either a first transform kernel matrix or a second transform kernel matrix may be used for the transform set in Table 9.

As in the 8×8 RST, only m transform coefficients may be output when only an mx16 portion of a 16×16 matrix is applied. For example, when only eight transform coefficients are output by setting m=8 and multiplying only an 8×16 matrix from the top, it is possible to reduce computational amount by half. To reduce computational amount in a worst case, an 8×16 matrix may be applied to a 4×4 transform unit (TU).

Basically, the transform kernel matrices applicable to a 4×4 region, presented in Table 9, may be applied to a 4×4 TU, a 4×M TU, and an Mx4 TU (M>4, the 4×M TU and the Mx4 TU may be divided into 4×4 regions, to which each designated transform kernel matrix may be applied, or the transform kernel matrices may be applied only to a maximum top-left 4×8 or 8×4 region) or may be applied only to a top-left 4×4 region. If the secondary transform is configured to be applied only to the top-left 4×4 region, the transform kernel matrices applicable to an 8×8 region, shown in Table 8, may be unnecessary.

The following embodiments may be proposed in order to reduce computational amount in a worst case. Hereinafter, a matrix including M rows and N columns is expressed as an M×N matrix, and the M×N matrix refers to a transform matrix applied in a forward transform, that is, when the encoding apparatus performs a transform (RST). Accordingly, in the inverse transform (inverse RST) performed by the decoding apparatus, an N×M matrix obtained by transposing the M×N matrix may be used.

1) In a case of a block (e.g., a transform unit) having a width of W and a height of H where W≥8 and H≥8, a transform kernel matrix applicable to an 8×8 region is applied to a top-left 8×8 region of the block. In a case where W=8 and H=8, only an 8×64 portion of a 16×64 matrix may be applied. That is, eight transform coefficients may be generated.

2) In a case of a block (e.g., a transform unit) having a width of W and a height of H where one of W and H is less than 8, that is, one of W and H is 4, a transform kernel matrix applicable to a 4×4 region is applied to a top-left region of the block. In a case where W=4 and H=4, only an 8×16 portion of a 16×16 matrix may be applied, in which case eight transform coefficients are generated.

If (W, H)=(4, 8) or (8, 4), a secondary transform is applied only to the top-left 4×4 region. If W or H is greater than 8, that is, if one of W and H is equal to or greater than 16 and the other is 4, the secondary transform is applied only to two top-left 4×4 blocks. That is, only a top-left 4×8 or 8×4 region may be divided into two 4×4 blocks, and a designated transform kernel matrix may be applied thereto.

3) In a case of a block (e.g., a transform unit) having a width of W and a height of H where both W and H are 4, a secondary transform may not be applied.

4) In a case of a block (e.g., a transform unit) having a width of W and a height of H, the number of coefficients generated by applying a secondary transform may be maintained to be ¼ or less of the area of the transform unit (i.e., the total number of pixels included in the transform unit=W×H). For example, when both W and H are 4, a top 4×16 matrix of a 16×16 matrix may be applied so that four transform coefficients are generated.

Assuming that a secondary transform is applied only to a top-left 8×8 region of the entire transform unit (TU), eight or less coefficients need to be generated for a 4×8 transform unit or a 8×4 transform unit, and thus a top 8×16 matrix of a 16×16 matrix may be applied to a top left 4×4 region. Up to a 16×64 matrix may be applied to an 8×8 transform unit (up to 16 coefficients can be generated). In a 4×N or N×4 (N≥16) transform unit, a 16×16 matrix may be applied to a top-left 4×4 block, or a top 8×16 matrix of the 16×16 matrix may be applied to two top-left 4×4 blocks. Similarly, in a 4×8 transform unit or 8×4 transform unit, eight transform coefficients may be generated by applying a top 4×16 matrix of the 16×16 matrix to two top-left 4×4 blocks.

5) The maximum size of a secondary transform applied to a 4×4 region may be limited to 8×16. In this case, the amount of a memory required to store transform kernel matrices applied to the 4×4 region can be reduced by half compared to that in a 16×16 matrix.

For example, in all transform kernel matrices shown in Table 9, the maximum size may be limited to 8×16 by extracting only a top 8×16 matrix of each 16×16 matrix, and an actual image coding system may be implemented to store only 8×16 matrices of the transform kernel matrices.

If the maximum applicable transform size is 8×16 and the maximum number of multiplications required to generate one coefficient is limited to 8, an up to 8×16 matrix may be applied to a 4×4 block, and an up to 8×16 matrix may be applied to each of up to two top-left two 4×4 blocks included in a 4×N block or an N×4 block (N≥8, N=2n, n≥3). For example, an 8×16 matrix may be stored for one top-left 4×4 block in a 4×N block or an N×4 block (N≥8, N=2n, n≥3).

According to an embodiment, when coding an index specifying a secondary transform to be applied to a luma component, specifically, when one transform set includes two transform kernel matrices, it is necessary to specify whether to apply the secondary transform and which transform kernel matrix to apply in the secondary transform. For example, when no secondary transform is applied, a transform index may be coded as 0, and when the secondary transform is applied, transform indexes for two transform sets may be coded as 1 and 2, respectively.

In this case, when coding the transform index, truncated unary coding may be used. For example, binary codes of 0, 10, and 11 may be respectively allocated to transform indexes 0, 1, and 2, thereby coding the transform indexes.

In addition, when coding the transform index by truncated unary coding, different CABAC context may be assigned to each bin. When coding the transform indexes 0, 10, and 11 in the above example, two CABAC contexts may be used.

When coding a transform index specifying a secondary transform to be applied to a chroma component, specifically, when one transform set includes two transform kernel matrices, it is necessary to specify whether to apply the secondary transform and which transform kernel matrix to apply in the secondary transform similarly to when coding the transform index of the secondary transform for the luman component. For example, when no secondary transform is applied, a transform index may be coded as 0, and when the secondary transform is applied, transform indexes for two transform sets may be coded as 1 and 2, respectively.

In this case, when coding the transform index, truncated unary coding may be used. For example, binary codes of 0, 10, and 11 may be respectively allocated to transform indexes 0, 1, and 2, thereby coding the transform indexes.

In addition, when coding the transform index by truncated unary coding, different CABAC context may be assigned to each bin. When coding the transform indexes 0, 10, and 11 in the above example, two CABAC contexts may be used.

According to an embodiment, a different CABAC context set may be allocated according to a chroma intra prediction mode. For example, when chroma intra prediction modes are divided into non-directional modes, such as a planar mode or a DC mode, and other directional modes (i.e., divided into two groups), a corresponding CABAC context set (including two contexts) may be allocated for each group when coding 0, 10, and 11 in the above example.

When the chroma intra prediction modes are divided into a plurality of groups and a corresponding CABAC context set is allocated, it is necessary to find out a chroma intra prediction mode value before coding the transform index of a secondary transform. However, in a chroma direct mode (DM), since a luma intra prediction mode value is used as it is, it is also necessary to find out an intra prediction mode value for a luma component. Therefore, when coding information on a chroma component, data dependency on luma component information may occur. Thus, in the chroma DM, when coding the transform index of the secondary transform without having information on the intra prediction mode, the data dependency can be removed by mapping to a specific group. For example, if the chroma intra prediction mode is the chroma DM, the transform index may be coded using a corresponding CABAC context set assuming the planner mode or the DC mode, or a corresponding CABAC context set may be applied assuming that other directional modes.

Meanwhile, as described above, the secondary transform may be performed based on a plurality of transform sets, and each transform set may be composed of a plurality of transform kernel matrices (or transforms). In this case, the transform set may be determined by being mapped to an intra prediction mode value, and a transform kernel matrix constituting the transform set may be determined by signaling a transform index indicating which transform kernel matrix is applied to perform transform.

Here, the secondary transform may be the aforementioned Reduced Secondary Transform (RST), Non-Separable Secondary Transform (NSST), Low-Frequency Non-Separable Transform (LFNST), layered Givens Transform (LGT), and the like. Therefore, when RST is applied to the secondary transform, index information signaled may be expressed as "RST index", nsst index, lfnst index, and the like. However, since the signaling method is irrelevant to what kind of secondary transform is applied, index information indicating the transformation kernel matrix is hereinafter referred to as "ST index".

Meanwhile, while signaling index information, a case where N transform kernel matrices constituting a transform set and a case where the secondary transform is not applied may also be signaled. For example, 0 to N may be assigned as an index value, index 0 may indicate a case where the secondary transform is not applied, and indexes 1 to N may be configured to indicate the corresponding N transformation kernel matrices. In addition, in the case of converting an index value from 0 to N into a binary value, that is, binarization, it can be binarized by a truncated unary method as follows.

TABLE 10

| value of index | Binary code | lengh of Binary code |
|---|---|---|
| 0 | 0 | 1 |
| 1 | 10 | 2 |
| 2 | 110 | 3 |
| N-1 | 111 · · · 10 | N |
| N | 111 · · · 11 | N |

As shown in Table 10, if the binary code is N, the maximum length of the binary code is N. If 0, 1, and 2 are assigned as index values (that is, when N=2), 0, 10, and 11 can be assigned to the corresponding binary code, respectively.

In general, the binary value of each position of a binary string is called a bin, and each bin of the binary string may be coded Context Adaptive Binary Arithmetic Coding (CABAC), or bypass coding method. The bypass coding method is a coding scheme that allocates a probability of 0.5 without context, and CABAC coding, which can be referred to as regular coding, is a coding scheme that obtains a probability value to be applied to coding from context information, that is, probability information.

When coded with CABAC coding, M context information can be used to code N bins, and each context information may be applied to coding one bin at a specific location or applied to coding a plurality of bins at multiple locations. Here, M may be equal to or smaller than N, and as described later, when a context set is applied, since two or more context information may be applied to one bin, M may be greater than N.

In addition, each context may be updated through a method applied in a codec (eg, HEV C, VVC) using CABAC, and the above-described regular coding method may also follow a method applied in an existing codec.

For example, if the index values are 0, 1, and 2 and 0, 10, and 11 are respectively assigned as corresponding binary codes, two context information can be applied by allocating context information to each bin. That is, context A can be applied when coding the first bin, and context B can be applied when coding the second bin.

According to an example, when the M pieces of context information constitute one bundle (context set), a plurality of context sets may be configured, and different context sets may be applied according to coding conditions.

For example, different context sets may be applied according to a tree type of the target block to be transformed. The tree type may be classified into a single tree (SINGLE_TREE) or a dual tree (DUAL_TREE) according to whether a luma block and a chroma block corresponding to the luma block each have a separate partitioning structure. If the chroma block has the same partitioning structure as the luma block, it can be represented as a single tree, and if the chroma block has a different partitioning structure from the luma component block, it can be represented as a dual tree. If the tree type is a single tree, a first context set may be used for coding the transform index, and if the tree type is a dual tree, a second context set may be used for coding the transform index.

That is, when the tree type is a single tree, the first context information is used in the first bin among the two bins, and the second context information is used in the second bin, the first context set is composed of the first context information and the second context information. When the tree type is a dual tree, if third context information is used in the first bin and the second context information is used in the second bin among the two bins, the second context set is composed of the third context information different from the first context set and the second context information. Of course, the second context set may include the third context information and fourth context information.

Specifically, if the index values are 0, 1, 2 and 0, 10, and 11 are respectively assigned to the corresponding binary code, two different context information (e.g., context 0 and context 2) can be applied to each bin. In this case, one context set may be composed of two contexts, and there may be a plurality of context sets composed of two contexts. The other context set may be composed of context 1 and context 2 and the other context set may include context information different from the first context set. Any one of a plurality of context sets may be selected according to a preset condition, for example, the tree type of a target block.

In summary, the context set composed of different context information may be applied for coding the transform index according to the tree type.

In addition, according to an example, if the index values are 0, 1, and 2 and 0, 10, and 11 are respectively assigned to the corresponding binary code, when coding the first bin, 0 and 10/11 are distinguished, and when coding the second bin, 10 and 11 are distinguished, one context set may consist of two context information when two bins are coded according to respective their own context information.

In addition, according to an example, it is also possible to hierarchically organize context sets. For example, by defining a bundle of context sets (a set of context sets), several "sets of context sets" are configured, and one of "the sets of context sets" are selected and applied to. When configuring the context set hierarchically, it is also possible to construct a set of several levels.

According to an example, when the context set is hierarchically organized with two levels, all contexts can be expressed in the following array.

$$ST\_index\_context[P][Q][2] \quad \text{[Equation 9]}$$

In Equation 9, P is a "set of context sets", and Q is a context set constituting the "set of context sets"

The ST_index_context indicates that context sets consisting of two contexts exists as many as the number corresponding to P×Q. That is, the "set of context sets" may be one of P, and one "set of context sets" is composed of Q context sets. Assuming that both P and Q values are 2, the context can be specified as a total of 3 variables (p, q, r) as follows:

$$ST\_index\_context[p][q][r](0 \leq p,q,r \leq 1) \quad \text{[Equation 10]}$$

In Equation 10, the variables p, q, and r may all be 0 or 1.

The variable r indicates a context and may be r=0 corresponding to the first bin and r=1 corresponding to the second bin in the above-described truncated universal code.

The variable q indicates the context set, and can be determined as in the following pseudo code example.

TABLE 11 g_chroma422intraAngleMappingTable[NUM_INTRA_MODE] = {0, 1, 2, 2, 2, 2, 2, 2, 2, 3, 4, 6, 8, 10, 12, 13, 14, 16, 18, 20, 22, 23, 24, 26, 28, 30, 32, 33, 34, 35, 35, 37, 35, 39, 40, 41, 42, 43, 44, 44, 44, 45, 46, 46, 46, 47, 45, 48, 43,49, 50, 51, 52, 52, 52, 53, 54, 54, 54, 55, 56, 56, 56, 57, 53, 59, 60, DM_CHROMA_IDX };
if (intra_mode == DM_chroma_mode and chroma_coding) {
   intra_mode = Planar_mode;
}
if (chroma_format == CHROMA_422 and chroma_coding) {
   intra_mode = g_chroma422intraAngleMappingTable [intra_mode];
}
if ( intra_mode == LM_chroma_mode or intra_mode == Planar_mode or intra_mode == DC_mode) {
   q = 1;
}
else {
   q = 0;
}

In the pseudo code of Table 11, 'DM_chroma_mode' and 'LM_chroma_mode' refers to a DM chroma coding modes that use the intra prediction mode of a luma component (the luma block) as the intra prediction mode of the chroma component (the chroma block), and an LM chroma coding mode that calculates a chroma prediction block based on a weight estimated from the neighboring reconstructed pixel values of the luma component (the luma block) and an offset value, respectively. 'chroma_coding' variable indicates whether the chroma component is coded, and 'Planar_mode' and 'DC_mode' indicate a planar prediction mode and a DC prediction mode, respectively.

The original prediction mode value was stored as an 'intra_mode' variable, but the value is temporarily changed by two if condition statements and is used to determine the q value. A 'chroma_format' variable indicates the resolution of the chroma component in the current picture, and 'CHROMA_422' indicates a 4:2:2 format. An array variable'g_chroma422IntraAngleMappingTable' presented in the pseudo code of Table 11 is an example of a mapping table for mode values, and 'DM_CHROMA_IDX' is an index indicating the DM chroma coding mode. As a mapping table, a mapping table different from g_chroma422IntraAngleMappingTable of Table 11 may be used, and some of the if condition statements presented in the pseudo code or only a part of each if condition statements may be used.

The variable p can also be determined according to the coding condition, for example, when an 'MTS_flag' value indicating whether MTS is applied to the residual sample is 1, and the ST index value for the luma component and the ST index value for the chroma component are separately coded, it may have a value of p=1, and in the other cases, p may have a value of 0. For example, when the partitioning structure of the luma component and the chroma component are coded in different dual trees, so that the syntax element for the luma component and the syntax element for the chrominance component are independently coded, p=1 value and in the other cases p may have a value of 0.

Figure 9:
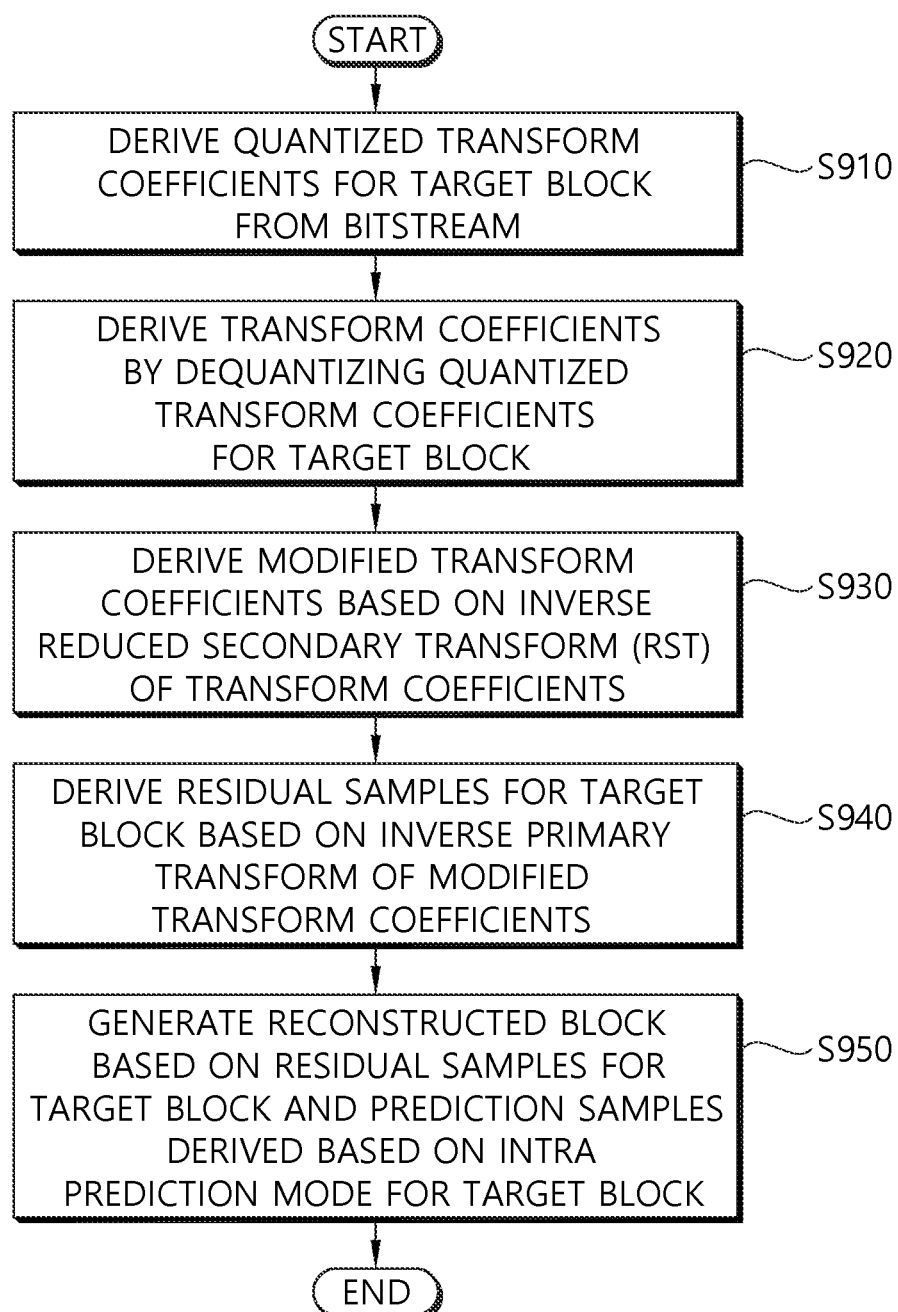
FIG. 9 is a flowchart illustrating an operation of a video decoding apparatus according to an embodiment of the present disclosure.

FIG. 9 is a flowchart illustrating an operation of a video decoding apparatus according to an embodiment of the present disclosure.

Each operation illustrated in FIG. 9 may be performed by the decoding apparatus 300 illustrated in FIG. 3. Specifically, S910 may be performed by the entropy decoder 310 illustrated in FIG. 3, S920 may be performed by the dequantizer 321 illustrated in FIGS. 3, S930 and S940 may be performed by the inverse transformer 322 illustrated in FIG. 3, and S950 may be performed by the adder 340 illustrated in FIG. 3. Operations according to S910 to S950 are based on some of the foregoing details explained with reference to FIG. 4 to FIG. 8. Therefore, a description of specific details overlapping with those explained above with reference to FIG. 3 to FIG. 8 will be omitted or will be made briefly.

The decoding apparatus 300 according to an embodiment may derive quantized transform coefficients for a target block from a bitstream (S910). Specifically, the decoding apparatus 300 may decode information on the quantized transform coefficients for the target block from the bitstream and may derive the quantized transform coefficients for the target block based on the information on the quantized transform coefficients for the target block. The information on the quantized transform coefficients for the target block may be included in a sequence parameter set (SPS) or a slice header and may include at least one of information on whether a reduced transform (RST) is applied, information on a reduced factor, information on a minimum transform size to which the RST is applied, information on a maximum transform size to which the RST is applied, information on a reduced inverse transform size, and information on a transform index indicating any one of transform kernel matrices included in a transform set.

The decoding apparatus 300 according to an embodiment may derive transform coefficients by dequantizing the quantized transform coefficients for the target block (S920).

The decoding apparatus 300 according to an embodiment may derive modified transform coefficients based on an inverse reduced secondary transform (RST) of the transform coefficients (S930).

In an example, the inverse RST may be performed based on an inverse RST transform matrix, and the inverse RST transform matrix may be a nonsquare matrix in which the number of columns is less than the number of rows.

In an embodiment, S930 may include decoding a transform index, determining whether a condition for applying an inverse RST is satisfied based on the transform index, selecting a transform kernel matrix, and applying the inverse RST to the transform coefficients based on the selected transform kernel matrix and/or the reduced factor when the condition for applying the inverse RST is satisfied. In this case, the size of a reduced inverse transform matrix may be determined based on the reduced factor.

The decoding apparatus 300 according to an embodiment may derive residual samples for the target block based on an inverse transform of the modified transform coefficients (S940).

The decoding apparatus 300 may perform an inverse primary transform on the modified transform coefficients for the target block, in which case a reduced inverse transform may be applied or a conventional separable transform may be used as the inverse primary transform.

The decoding apparatus 300 according to an embodiment may generate reconstructed samples based on the residual samples for the target block and prediction samples for the target block (S950).

Referring to S930, it may be identified that the residual samples for the target block are derived based on the inverse RST of the transform coefficients for the target block. From the perspective of the size of the inverse transform matrix, since the size of a regular inverse transform matrix is N×N but the size of the inverse RST matrix is reduced to N×R, it is possible to reduce memory usage in a case of performing the inverse RST by an R/N ratio compared to that in a case of performing a regular transform. Further, using the inverse RST matrix can reduce the number of multiplications (N×R) by the R/N ratio, compared to the number of multiplications N×N in a case of using the regular inverse transform matrix. In addition, since only R transform coefficients need to be decoded when the inverse RST is applied, the total number of transform coefficients for the target block may be reduced from N to R, compared to that in a case where N transform coefficients needs to be decoded when a regular inverse transform is applied, thus increasing decoding efficiency. That is, according to S930, the (inverse) transform efficiency and decoding efficiency of the decoding apparatus 300 may be increased through the inverse RST.

Figure 10:
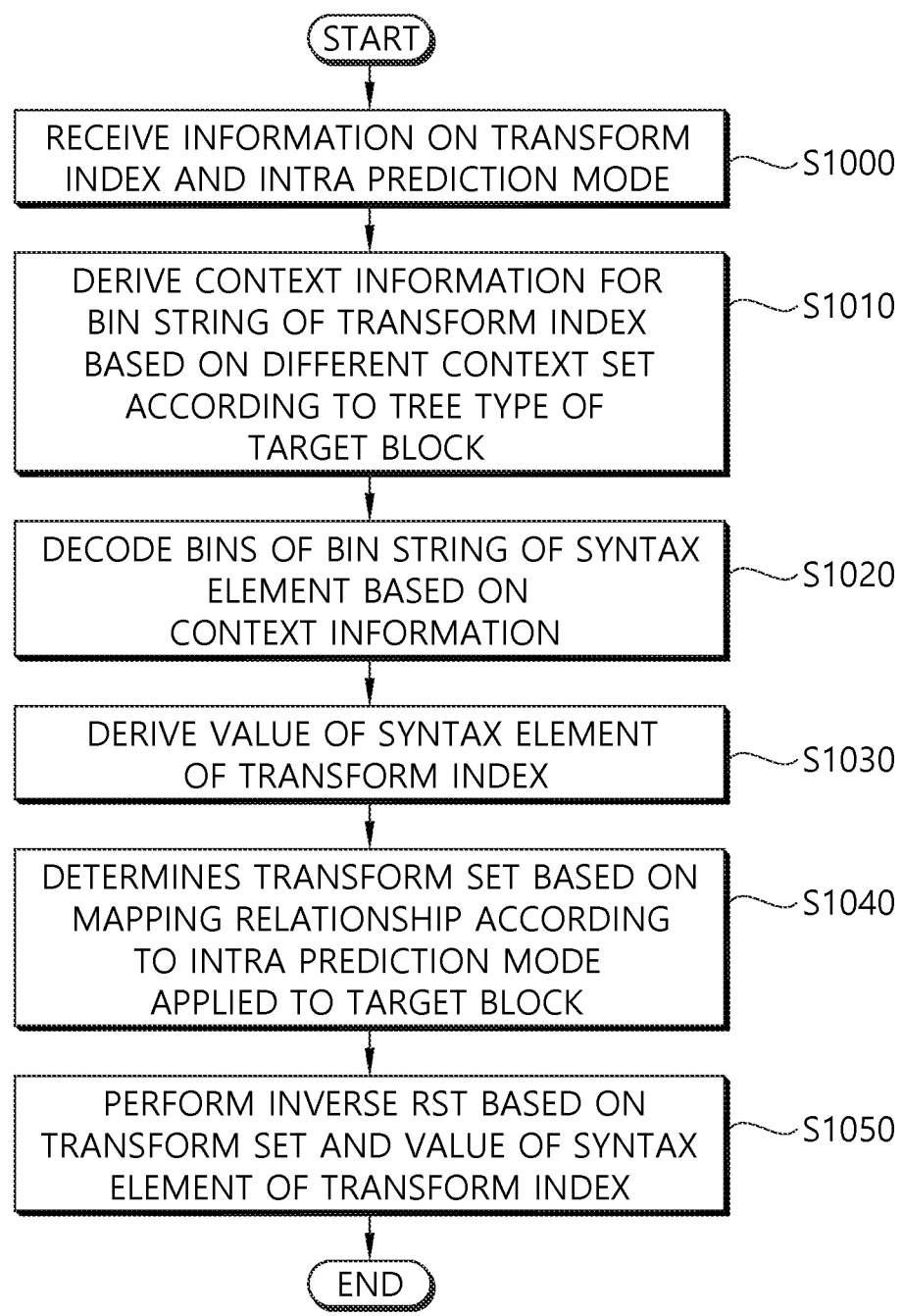
FIG. 10 is a control flowchart illustrating an inverse RST according to an embodiment of the present disclosure.

FIG. 10 is a control flowchart illustrating an inverse RST according to an embodiment of the present disclosure.

The decoding apparatus 300 receives information on a transform index and an intra prediction mode from a bitstream (S1000).

This information is received as syntax information, and the syntax information is received as a bin string including a 0 and a 1.

The entropy decoder 310 may derive binarization information on a syntax element for the transform index.

This operation is generating a candidate set for a binary value that the syntax element of the received transform index can have. According to this embodiment, the syntax element for the transform index may be binarized by truncated unary coding.

The syntax element for the transform index according to this embodiment may indicate whether an inverse RST is applied and one of transform kernel matrices included in a transform set. When the transform set includes two transform kernel matrices, the syntax element for the transform index may have three values.

That is, according to an embodiment, the value of the syntax element for the transform index may include 0 indicating that the inverse RST is not applied to a target block, 1 indicating a first transform kernel matrix of the transform kernel matrices, and 2 indicating a second transform kernel matrix of the transform kernel matrices.

In this case, the three values of the syntax element for the transform index may be coded into 0, 10, and 11, respectively, according to truncated unary coding. That is, the value of the syntax element of 0 may be binarized into '0', the value of the syntax element of 1 may be binarized into '10', and the value of the syntax element of 2 may be binarized into '11'.

The entropy decoder 310 derives context information, that is, a context model, for a bin string of the transform index based on a different context set according to the tree type of the target block (S1010), and may decode bins of a syntax element bin string based on the context information (S1020).

According to the this embodiment, different pieces of context information, that is, a probability model, may be applied to two bins of the transform index, respectively. That is, all of the two bins of the transform index may be decoded by a context method rather than by a bypass method, wherein a first bin of the bins of the syntax element for the transform index may be decoded based on first context information, and a second bin of the bins of the syntax element for the transform index may be decoded based on second context information.

This context information can be derived based on different context sets.

For example, the tree type of the targer block may be classified into a single tree (SINGLE_TREE) or a dual tree (DUAL_TREE) according to whether a luma block and a chroma block corresponding to the luma block each have a separate partitioning structure. If the chroma block has the same partitioning structure as the luma block, it can be represented as a single tree, and if the chroma block has a different partitioning structure from the luma component block, it can be represented as a dual tree. If the tree type is a single tree, a first context set may be used for coding the transform index, and if the tree type is a dual tree, a second context set may be used for coding the transform index.

That is, when the tree type of the target block is a dual tree type, the context information is derived based on the first context set, and when the tree type of the target block is a single tree type, the context information is based on a second context set different from the first context set. In this case, the first context set is composed of the first context information for the first bin among the bins of the syntax element for the transform index and the second context information for the second bin among the bins of the syntax element for the transform index. The second context set may include the third context information for a first bin among the bins of the syntax element for the transform index and the fourth context information for the second bin among the bins for the syntax element for the transform index.

According to an embodiment, the first context information and the third context information may be different from each other, and the second context information and the fourth context information may be the same. Of course, the second context information and the fourth context information may be different from each other.

In summary, the entropy decoder 310 receives the binarized string using the truncated unary code method, and based on the context set and context information corresponding thereto, decode the syntax element for the transform index using a candidate set for the corresponding binarization value.

The value of the syntax element for the transform index applied to the target block among binary values that the syntax element for the transform index can have may be derived by this context information-based decoding (S1030).

That is, which one of transform indexes of 0, 1, and 2 is applied to the current target block may be derived.

The inverse transformer 322 of the decoding apparatus 300 determines a transform set based on a mapping relationship according to the intra prediction mode applied to the target block (S1040) and may perform an inverse RST based on the transform set and the value of the syntax element for the transform index (S1050).

As described above, a plurality of transform sets may be determined according to an intra prediction mode of a transform block to be transformed, and an RST may be performed based on any one of transform kernel matrices included in a transform set indicated by a transform index.

Figure 11:
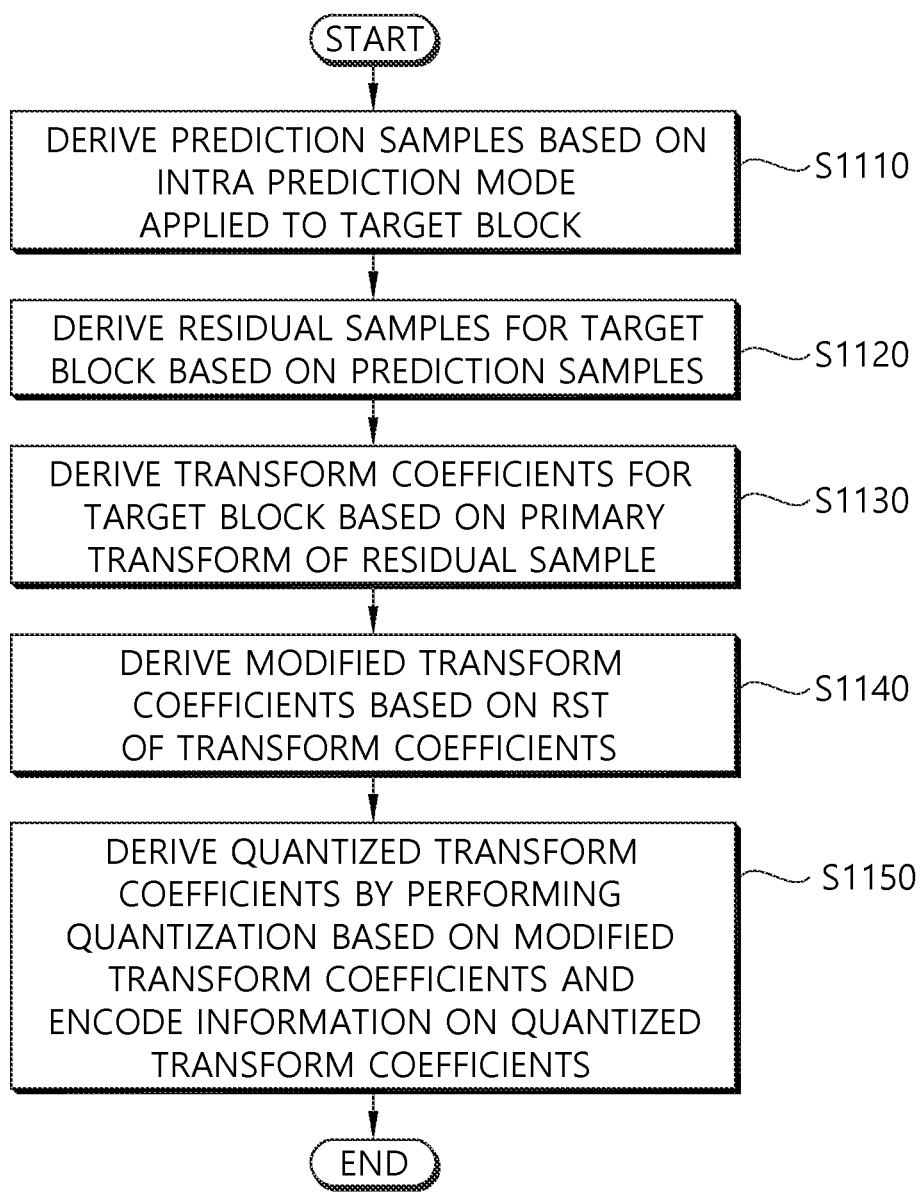
FIG. 11 is a flowchart illustrating an operation of a video encoding apparatus according to an embodiment of the present disclosure.

FIG. 11 is a flowchart illustrating an operation of a video encoding apparatus according to an embodiment of the present disclosure.

Each operation illustrated in FIG. 11 may be performed by the encoding apparatus 200 illustrated in FIG. 2. Specifically, S1110 may be performed by the predictor 220 illustrated in FIG. 2, S1120 may be performed by the subtractor 231 illustrated in FIGS. 2, S1130 and S1140 may be performed by the transformer 232 illustrated in FIG. 2, and S1150 may be performed by the quantizer 233 and the entropy encoder 240 illustrated in FIG. 2. Operations according to S1110 to S1150 are based on some of contents described in FIG. 4 to FIG. 8. Therefore, a description of specific details overlapping with those explained above with reference to FIG. 4 to FIG. 8 will be omitted or will be made briefly.

The encoding apparatus 200 according to an embodiment may derive prediction samples based on an intra prediction mode applied to a target block (S1110).

The encoding apparatus 200 according to an embodiment may derive residual samples for the target block (S1120).

The encoding apparatus 200 according to an embodiment may derive transform coefficients for the target block based on primary transform of the residual sample (S1130). The primary transform may be performed through a plurality of transform kernels, and the transform kernels may be selected based on the intra prediction mode.

The decoding apparatus 300 may perform a secondary transform, specifically an NSST, on the transform coefficients for the target block, in which case the NSST may be performed based on a reduced transform (RST) or without being based on the RST. When the NSST is performed based on the reduced transform, an operation according to S1140 may be performed.

The encoding apparatus 200 according to an embodiment may derive modified transform coefficients for the target block based on the RST of the transform coefficients (S1140). In an example, the RST may be performed based on a reduced transform matrix or a transform kernel matrix, and the reduced transform matrix may be a nonsquare matrix in which the number of rows is less than the number of columns.

In an embodiment, S1140 may include determining whether a condition for applying the RST is satisfied, generating and encoding the transform index based on the determination, selecting a transform kernel, and applying the RST to the residual samples based on the selected transform kernel matrix and/or a reduced factor when the condition for applying the RST is satisfied. In this case, the size of the reduced transform kernel matrix may be determined based on the reduced factor.

The encoding apparatus 200 according to an embodiment may derive quantized transform coefficients by performing quantization based on the modified transform coefficients for the target block and may encode information on the quantized transform coefficients (S1150).

Specifically, the encoding apparatus 200 may generate the information on the quantized transform coefficients and may encode the generated information on the quantized transform coefficients.

In an example, the information on the quantized transform coefficients may include at least one of information on whether the RST is applied, information on the reduced factor, information on a minimum transform size to which the RST is applied, and information on a maximum transform size to which the RST is applied.

Referring to S1140, it may be identified that the transform coefficients for the target block are derived based on the RST of the residual samples. From the perspective of the size of the transform kernel matrix, since the size of a regular transform kernel matrix is N×N but the size of the reduced transform matrix is reduced to R×N, it is possible to reduce memory usage in a case of performing the RST by an R/N ratio compared to that in a case of performing a regular transform. Further, using the reduced transform kernel matrix can reduce the number of multiplications (R×N) by the R/N ratio, compared to the number of multiplications N×N in a case of using the regular transform kernel matrix. In addition, since only R transform coefficients are derived when the RST is applied, the total number of transform coefficients for the target block may be reduced from N to R, compared to that in a case where N transform coefficients are derived when a regular transform is applied, thus reducing the amount of data transmitted by the encoding apparatus 200 to the decoding apparatus 300. That is, according to S1140, the transform efficiency and coding efficiency of the encoding apparatus 320 may be increased through the RST.

Figure 12:
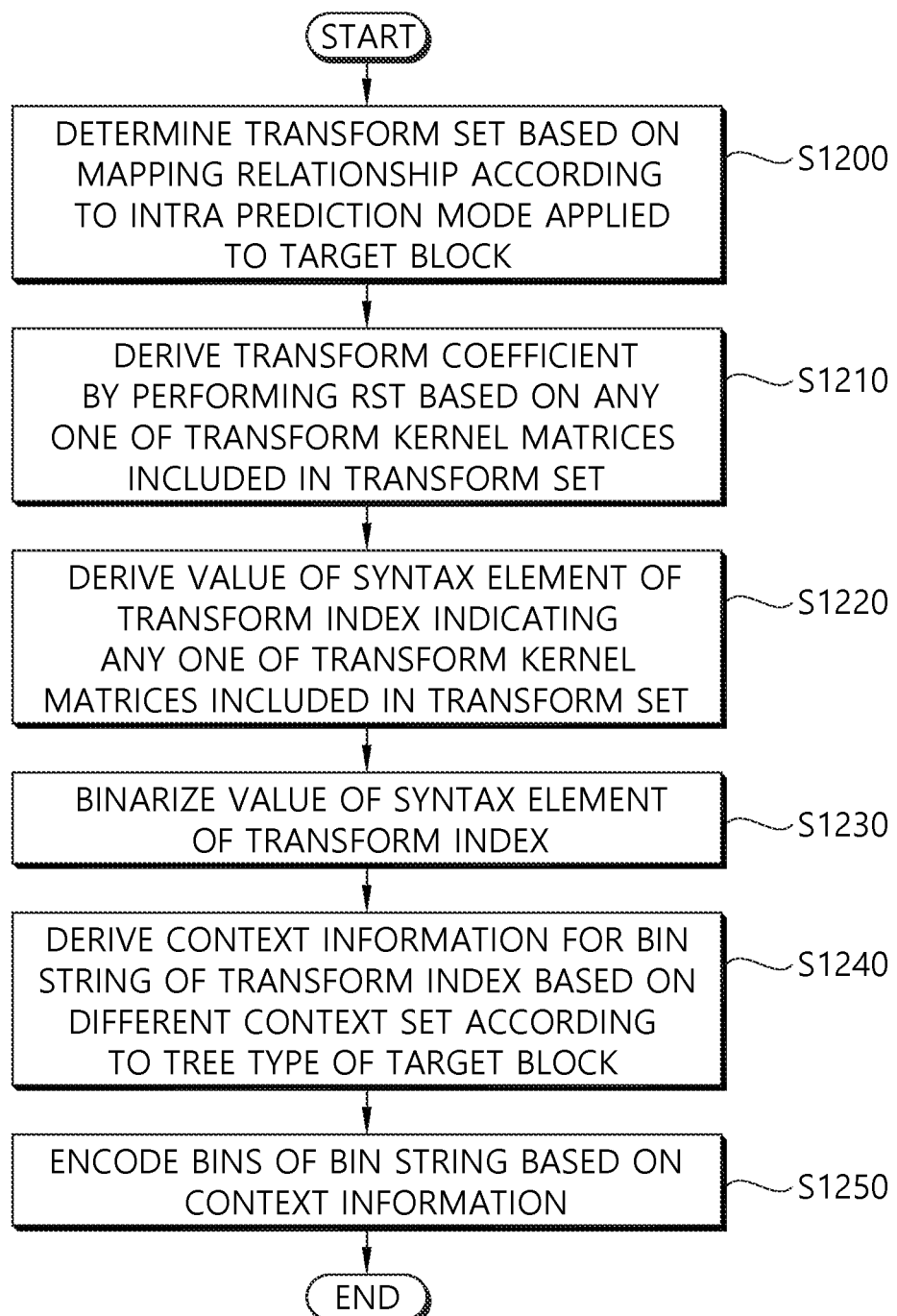
FIG. 12 is a control flowchart illustrating an RST according to an embodiment of the present disclosure.

FIG. 12 is a control flowchart illustrating an RST according to an embodiment of the present disclosure.

First, the encoding apparatus 200 may determine a transform set based on a mapping relationship according to an intra prediction mode applied to a target block (S1200).

The transformer 232 may derive a transform coefficient by performing an RST based on any one of transform kernel matrices included in the transform set (S1210).

In this embodiment, the transform coefficient may be a modified transform coefficient resulting from a primary transform and then a secondary transform, and two transform kernel matrices may be included in each transform set.

When the RST is performed, information on the RST may be encoded by the entropy encoder 240.

The entropy encoder 240 may derive the value of a syntax element of a transform index indicating any one of the transform kernel matrices included in the transform set (S1220).

The syntax element for the transform index according to this embodiment may indicate whether an (inverse) RST is applied and any one of the transform kernel matrices included in the transform set. When the transform set includes two transform kernel matrices, the syntax element for the transform index may have three values.

According to an embodiment, the value of the syntax element for the transform index may be derived as 0 indicating that the (inverse) RST is not applied to a target block, as 1 indicating a first transform kernel matrix of the transform kernel matrices, or as 2 indicating a second transform kernel matrix of the transform kernel matrices.

The entropy encoder 240 may binarize the derived value of the syntax element for the transform index (S1230).

The entropy encoder 240 may binarize the three values of the syntax element for the transform index into 0, 10, and 11 according to truncated unary coding. That is, the value of the syntax element of 0 may be binarized into '0', the value of the syntax element of 1 may be binarized into '10', and the value of the syntax element of 2 may be binarized into '11', and the entropy encoder 240 may binarize the derived syntax element for the transform index into one of '0', '10, and '11'.

The entropy encoder 240 derives context information for a bin string of the transform index binarized based on a different context set according to the tree type of the target block (S1240), and may encode bins of the syntax element bin string based on the context information (S1250).

According to the this embodiment, different pieces of context information, may be applied to each of two bins of the transform index. That is, all of the two bins of the transform index may be encoded by a context method rather than by a bypass method, wherein the first bin of the bins of the syntax element for the transform index may be encoded based on first context information, and the second bin of the bins of the syntax element for the transform index may be encoded based on second context information.

This context information can be derived based on different context sets.

For example, the tree type of the targer block may be classified into a single tree (SINGLE_TREE) or a dual tree (DUAL_TREE) according to whether a luma block and a chroma block corresponding to the luma block each have a separate partitioning structure. If the chroma block has the same partitioning structure as the luma block, it can be represented as a single tree, and if the chroma block has a different partitioning structure from the luma component block, it can be represented as a dual tree. If the tree type is a single tree, a first context set may be used for coding the transform index, and if the tree type is a dual tree, a second context set may be used for coding the transform index.

That is, when the tree type of the target block is a dual tree type, the context information is derived based on the first context set, and when the tree type of the target block is a single tree type, the context information is based on a second context set different from the first context set. In this case, the first context set is composed of the first context information for the first bin among the bins of the syntax element for the transform index and the second context information for the second bin among the bins of the syntax element for the transform index. The second context set may include the third context information for a first bin among the bins of the syntax element for the transform index and the fourth context information for the second bin among the bins for the syntax element for the transform index.

According to an embodiment, the first context information and the third context information may be different from each other, and the second context information and the fourth context information may be the same. Of course, the second context information and the fourth context information may be different from each other.

The encoded bin string of the syntax element may be output as a bitstream to the decoding apparatus 300 or to the outside.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip.

Further, the decoding apparatus and the encoding apparatus to which the present disclosure is applied, may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied, may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network. Additionally, the embodiments of the present disclosure may be embodied as a computer program product by program codes, and the program codes may be executed on a computer by the embodiments of the present disclosure. The program codes may be stored on a computer-readable carrier.

Figure 13:
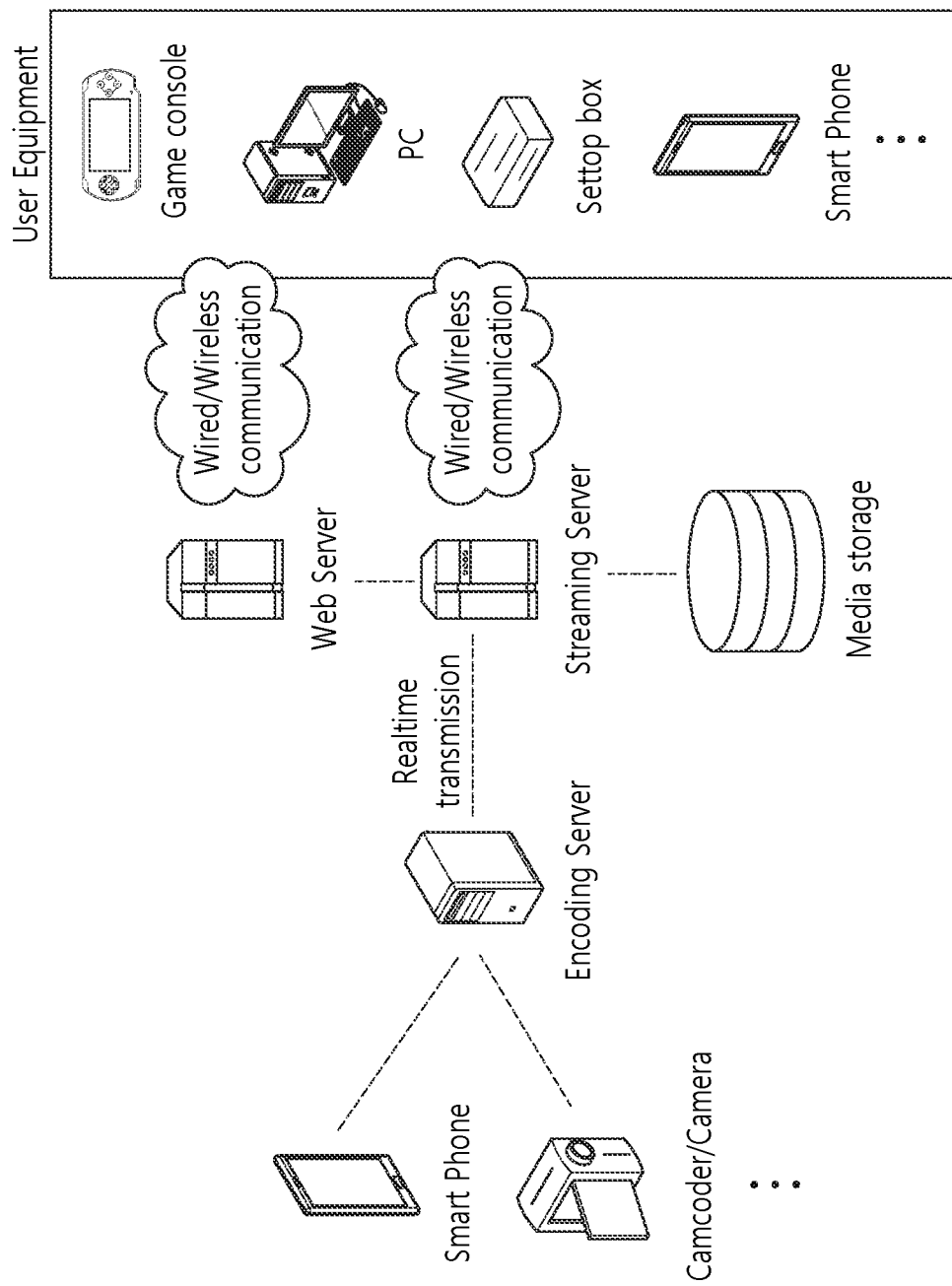
FIG. 13 illustrates the structure of a content streaming system to which the present disclosure is applied.

FIG. 13 illustrates the structure of a content streaming system to which the present disclosure is applied.

Further, the contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the multimedia input device, such as, the smart phone, the camera, the camcoder or the like, directly generates a bitstream, the encoding server may be omitted. The bitstream may be generated by an encoding method or a bitstream generation method to which the present disclosure is applied. And the streaming server may store the bitstream temporarily during a process to transmit or receive the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like. Each of servers in the contents streaming system may be operated as a distributed server, and in this case, data received by each server may be processed in distributed manner.

What is claimed is:

1. An image decoding method performed by a decoding apparatus, the method comprising:
receiving residual information and a transform index from a bitstream;
deriving transform coefficients for a target block based on the residual information;
deriving modified transform coefficients based on an inverse non-separable transform for the transform coefficients; and
deriving residual samples for the target block based on an inverse primary transform for the modified transform coefficients,
wherein the inverse non-separable transform is performed based on a transform kernel matrix related to the transform index among transform kernel matrices included in a transform set,
wherein the transform index is decoded based on a context adaptive binary arithmetic coding (CABAC) and by:
deriving context information of a syntax element for the transform index;
decoding, based on the context information, bins of the syntax element for the transform index, the bins including a first bin and a second bind; and
deriving, based on the decoded bins, a value of the syntax element for the transform index,
wherein (i) based on a tree type of the target block being a dual tree type, the first bin of the syntax element for the transform index is derived based on a first context information, and (ii) based on the tree type of the target block being a single tree type, the first bin of the syntax element for the transform index is derived based on a second context information, and
wherein the first context information and the second context information are different from each other.

2. The image decoding method of claim 1, wherein (i) based on the tree type of the target block being a dual tree type, the second bin of the syntax element for the transform index is derived based on a third context information, and (ii) based on the tree type of the target block being the single tree type, the second bin of the syntax element for the transform index is derived based on a fourth context information, and
wherein the third context information is the same as the fourth context information.

3. The image decoding method of claim 1, wherein the value of the syntax element comprises any one of 0 indicating that the inverse non-separable transform is not applied to the target block, 1 indicating a first transform kernel matrix as the transform kernel matrix, and 2 indicating a second transform kernel matrix as the transform kernel matrix.

4. The image decoding method of claim 3, wherein the value of the syntax element is binarized by a truncated unary code, and
wherein the value of the syntax element of 0 is binarized into '0', the value of the syntax element of 1 is binarized into '10', and the value of the syntax element of 2 is binarized into '11'.

5. The image decoding method of claim 1, wherein the inverse non-separable transform is an inverse transform of a transform that derives a smaller number of transform coefficients than transform coefficients for a predetermined top-left area of the target block based on the transform coefficients for the top-left area.

6. An image encoding method performed by an image encoding apparatus, the method comprising:
deriving residual samples for a target block;
deriving transform coefficients for the target block based on a primary transform for the residual samples;
deriving modified transform coefficients based on a non-separable transform of the transform coefficients; and
encoding image information including residual information related to the modified transform coefficients and a transform index,
wherein the non-separable transform is performed based on a transform kernel matrix of the target block among transform kernel matrices included in a transform set, and
wherein the transform index is encoded based on a CABAC and by:
deriving a value of a syntax element for the transform index;

deriving, context information of the syntax element for the transform index; and encoding, based on the context information, bins of the syntax element for the transform index, the bins including a first bin and a second bin, wherein (i) based on a tree type of the target block being a dual tree type, the first bin of the syntax element for the transform index is encoded based on a first context information, and (ii) based on the tree type of the target block being a single tree type, the first bin of the syntax element for the transform index is encoded based on a second context information, and wherein the first context information and the second context information are different from each other.

7. The image encoding method of claim 6, wherein (i) based on the tree type of the target block being a dual tree type, the second bin of the syntax element for the transform index is encoded based on a third context information, and (ii) based on the tree type of the target block being the single tree type, the second bin of the syntax element for the transform index is encoded based on a fourth context information, and wherein the third context information is the same as the fourth context information.

8. The image encoding method of claim 6, wherein the non-separable transform is a transform that derives a smaller number of transform coefficients than transform coefficients for a predetermined top-left area of the target block based on the transform coefficients for the top-left area.

9. The image encoding method of claim 6, wherein the value of the syntax element comprises any one of 0 indicating that the inverse non-separable transform is not applied to the target block, 1 indicating a first transform kernel matrix as the transform kernel matrix, and 2 indicating a second transform kernel matrix as the transform kernel matrix.

10. The image encoding method of claim 9, wherein the value of the syntax element is binarized by a truncated unary code, and wherein the value of the syntax element of 0 is binarized into '0', the value of the syntax element of 1 is binarized into '10', and the value of the syntax element of 2 is binarized into '11'.

11. A non-transitory computer-readable storage medium storing a bitstream generated by a method, the method comprising:

deriving residual samples for a target block;

deriving transform coefficients for the target block based on a primary transform for the residual samples;

deriving modified transform coefficients based on a non-separable transform of the transform coefficients, and encoding image information including residual information related to the modified transform coefficients and a transform index to generate the bitstream, wherein the non-separable transform is performed based on a transform kernel matrix of the target block among transform kernel matrices included in a transform set, and wherein the transform index is encoded based on a CABAC and by:

deriving a value of a syntax element for the transform index, deriving, context information of the syntax element for the transform index, and encoding, based on the context information, bins of the syntax element for the transform index, the bins including a first bin and a second bin, wherein (i) based on a tree type of the target block being a dual tree type, the first bin of the syntax element for the transform index is encoded based on a first context information, and (ii) based on the tree type of the target block being a single tree type, the first bin of the syntax element for the transform index is encoded based on a second context information, and wherein the first context information and the second context information are different from each other.

12. The non-transitory computer-readable storage medium of claim 11, wherein (i) based on the tree type of the target block being a dual tree type, the second bin of the syntax element for the transform index is encoded based on a third context information, and (ii) based on the tree type of the target block being the single tree type, the second bin of the syntax element for the transform index is encoded based on a fourth context information, and wherein the third context information is the same as the fourth context information.

\* \* \* \* \*